(12) United States Patent
Zimmerman

(10) Patent No.: US 8,646,605 B2
(45) Date of Patent: Feb. 11, 2014

(54) REUSABLE MEDICAL GOWN DISTRIBUTION AND DISPENSING

(75) Inventor: Ira N. Zimmerman, Cincinnati, OH (US)

(73) Assignee: Standard Textile Co., Inc., Cincinnati, OH (US)

(*) Notice: Subject to any disclaimer, the term of this patent is extended or adjusted under 35 U.S.C. 154(b) by 258 days.

(21) Appl. No.: 13/069,986

(22) Filed: Mar. 23, 2011

(65) Prior Publication Data

US 2012/0241463 A1    Sep. 27, 2012

(51) Int. Cl.
| | |
|---|---|
| A61B 17/06 | (2006.01) |
| A61B 19/02 | (2006.01) |
| A61L 15/00 | (2006.01) |
| B65D 33/24 | (2006.01) |
| B65D 33/00 | (2006.01) |

(52) U.S. Cl.
USPC ............... 206/440; 383/87; 383/41; 383/43; 383/24

(58) Field of Classification Search
USPC ......... 206/440, 315.9; 221/64, 282, 283, 199, 221/360–307, 304; 383/67, 41, 78, 80, 84, 383/87, 125–126, 206, 6, 16, 43, 24, 72
See application file for complete search history.

(56) References Cited

U.S. PATENT DOCUMENTS

| | | | |
|---|---|---|---|
| 2,617,581 A | 11/1952 | Smith | |
| 2,761,480 A * | 9/1956 | Tames | 383/16 |
| 4,632,301 A | 12/1986 | Slack | |
| 5,088,620 A | 2/1992 | Kelliher et al. | |
| 5,096,089 A | 3/1992 | McLaughlin | |
| 5,190,197 A | 3/1993 | Novak | |
| 5,323,994 A | 6/1994 | Shillington et al. | |
| 5,341,933 A * | 8/1994 | Willows | 206/554 |
| 5,451,108 A * | 9/1995 | Anderson | 383/38 |
| 5,687,840 A * | 11/1997 | Sherman | 206/216 |
| D387,981 S | 12/1997 | Mosior et al. | |
| 5,692,836 A * | 12/1997 | Mitchell | 383/40 |
| D393,504 S * | 4/1998 | Eisman | D30/153 |
| 5,816,440 A | 10/1998 | Shields et al. | |
| 5,921,434 A | 7/1999 | Hollander et al. | |
| 6,021,919 A | 2/2000 | Kelly | |
| 6,190,045 B1 * | 2/2001 | Schulman | 383/24 |
| 6,267,244 B1 * | 7/2001 | Witt et al. | 206/702 |

(Continued)

OTHER PUBLICATIONS

Official Action issued in counterpart Canadian Application No. 2738338 on Aug. 23, 2012 (4 pages).

(Continued)

*Primary Examiner* — Mickey Yu
*Assistant Examiner* — Chun Cheung
(74) *Attorney, Agent, or Firm* — Wood, Herron & Evans, LLP

(57) ABSTRACT

Distribution and dispensing modalities are provided for reusable medical gowns which involves generally loose handling thereof. Dispensing containers have a collapsible sidewall structure extending between opposite ends and defining therebetween an interior when un-collapsed or erected, at least one of the ends defining an opening through which clean, reusable medical gowns can be loaded, a closure repeatably manipulatable to open and close the opening, and a controllable access aperture at least a portion, or all, of which is spaced from the opening through which to selectively remove a clean, reusable medical gown. The loaded dispensing container may be transported to or around a healthcare facility and placed where needed for ready access at the point-of-use to clean, reusable medical gowns through the controllable access aperture.

6 Claims, 19 Drawing Sheets

(56) References Cited

U.S. PATENT DOCUMENTS

| | | |
|---|---|---|
| D460,301 S | 7/2002 | Milliorn |
| 6,443,327 B1 * | 9/2002 | Chen ............................ 221/303 |
| 6,478,157 B1 * | 11/2002 | Witt et al. ..................... 206/702 |
| 7,246,710 B2 | 7/2007 | Graneto, III |
| 7,344,308 B2 * | 3/2008 | Meyer et al. .................... 383/41 |
| 7,665,811 B2 | 2/2010 | Johanning |
| 7,735,650 B2 | 6/2010 | Zumbiel |
| 7,992,744 B2 | 8/2011 | Szymonski et al. |
| 2002/0040912 A1 | 4/2002 | McHugh |

OTHER PUBLICATIONS

Brochure, Kinberly-Clark Personal Protective Equipment, HO865-09-01; 2009 (4 of 6 pages).

Brochure, Medline Reusable Isolation Gowns (MKT2120020/LIT82R1/5M/SG24) 2011 (4 of 6 pages).

* cited by examiner

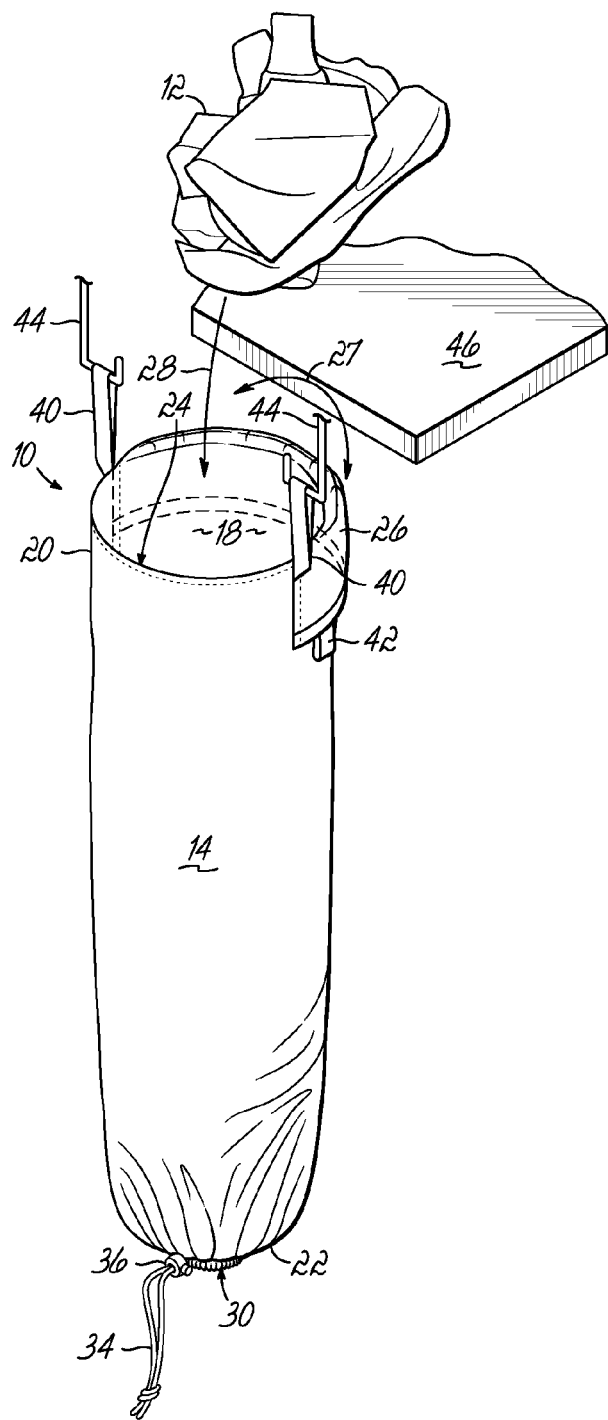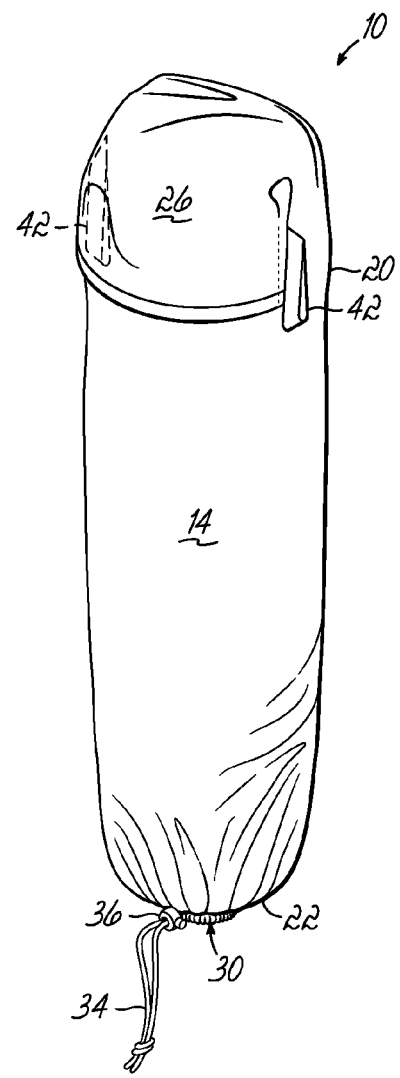
FIG. 3
FIG. 4

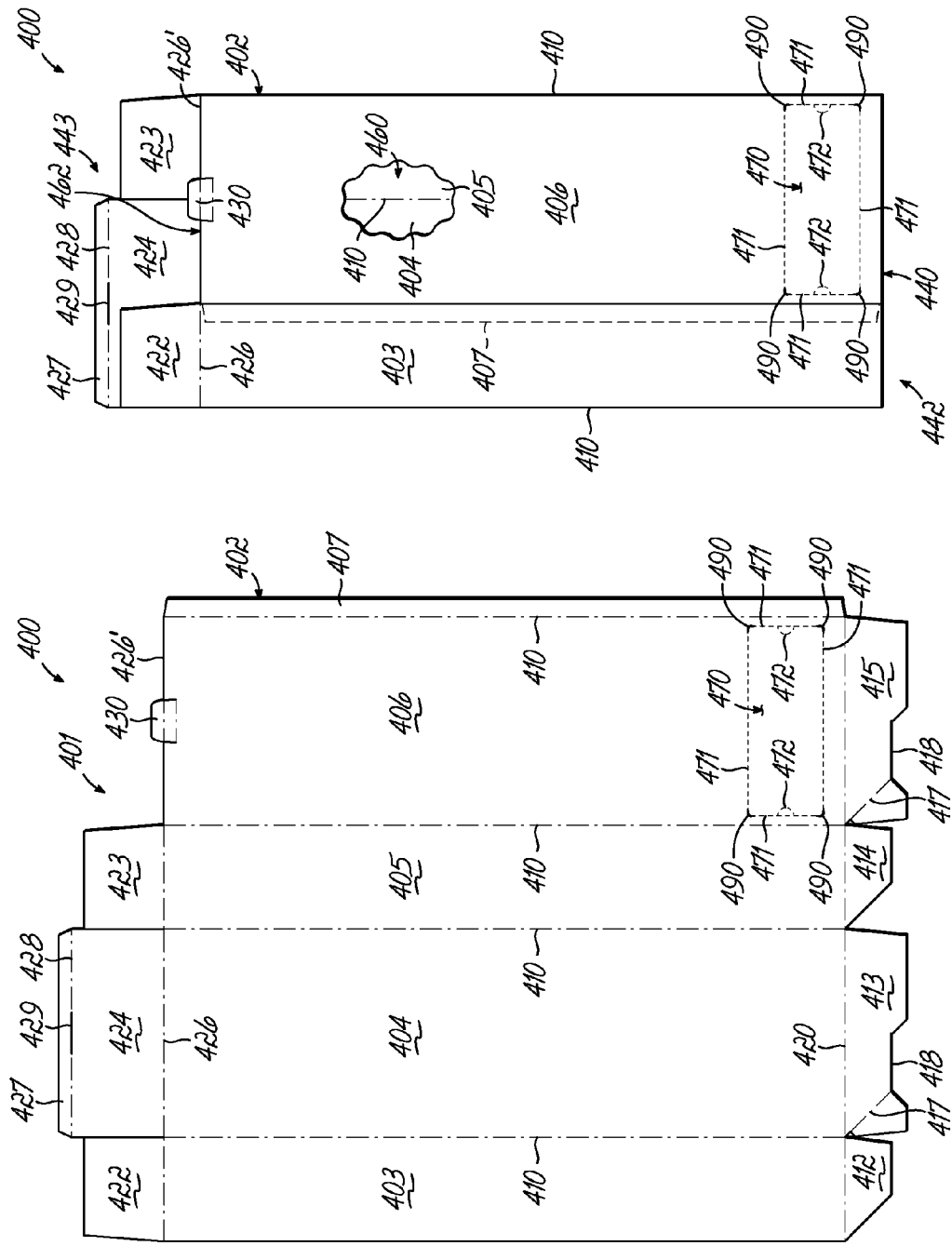

US 8,646,605 B2

REUSABLE MEDICAL GOWN DISTRIBUTION AND DISPENSING

FIELD OF THE INVENTION

The present invention relates to distribution and dispensing of reusable medical gowns, and to dispensing containers and/or supporting boxes to facilitate same.

BACKGROUND OF THE INVENTION

Medical practitioners often need ready access to a medical gown which they can quickly don over their clothing when working with patients or material in healthcare facilities, such as clinics, doctor's offices, hospitals, nursing homes, and the like. Typical medical gowns have a front apron portion to overlie the medical practitioners chest and upper leg areas, and a pair of sleeves into which the arms of the medical practitioner are inserted through an open back of the medical gown. The medical gown may also include ties or other structure to hold the sides of the back together. One type of medical gown that is widely used is referred to as a precaution gown or an isolation gown as it provides some level of protection to medical practitioners when dealing with patients and materials, such as by forming the medical gown of synthetic barrier materials. These gowns may be kept at the ready in a drawer of an isolation cart, for example, for ready use by a medical practitioner.

Medical gowns may either be disposable after use, or they may be reusable in that after being used, they may be laundered and returned to use. Each has its own concerns. For example, while a disposable medical gown may be less costly to acquire than a reusable medical gown, it will cost a healthcare facility more in the long run to acquire disposable medical gowns for each use than to acquire and utilize reusable medical gowns even considering laundry costs associated with reusable medical gowns. Similarly, there are environmental concerns with disposable medical gowns that are different from those related to reusable medical gowns.

Characteristic of reusable synthetic medical gowns is that they are not easily handled such as for folding in a manner to facilitate convenient point-of-use dispensing. As a consequence, they are often handled rather haphazardly, such as in a clump or other generally amorphous shape. By way of example, a number of reusable medical gowns may be stuffed as a loose group into the drawer of an isolation cart. When one of the reusable medical gowns is needed, a medical practitioner opens the drawer, reaches in, and pulls out a gown. However, having a collection of loose gowns creates difficulties in the management and handling of the reusable medical gowns.

After use of a reusable medical gown, a medical practitioner will typically remove the soiled gown and place it in a hamper bag, or the like, at the medical facility. The hamper bag, which may also have other soiled or used medical textile items therein, is then removed to a laundry location. The hamper bags are emptied, and the items sorted and laundered (including the hamper bags, if reusable). After laundering, clean, reusable medical gowns need to be delivered to or around the healthcare facility and distributed for use, such as by loading loose groups thereof in the isolation carts. Because current synthetic reusable medical gowns are not amenable to ready folding and stacking, they tend to be simply piled together in a large mass, delivered to the healthcare facility in that form, and then handled individually or in piles for distribution and dispensing throughout the healthcare facility.

Consequently, there may be reluctance on the part of operators of healthcare facilities to utilize reusable medical gowns and they may instead opt for disposable medical gowns, notwithstanding the added costs, and environmental and other drawbacks associated with disposable medical gowns. Many medical practitioners, however, may prefer reusable medical gowns for their performance and comfort as compared to disposable medical gowns.

SUMMARY OF THE INVENTION

In order to enhance the likelihood that a healthcare facility will provide reusable medical gowns within the facility as opposed to disposable medical gowns, it is necessary to develop distribution and dispensing modalities that overcome the problems currently associated with present distribution and dispensing modalities for reusable medical gowns which involves generally loose handling thereof. To that end, and in accordance with some of the principles of the present invention, dispensing containers are provided having a collapsible sidewall structure extending between opposite ends and defining therebetween an interior when un-collapsed or erected, with at least one of the ends defining an opening through which clean, reusable medical gowns can be loaded such as at the laundry facility or in a location of a healthcare facility, a closure repeatably manipulatable to open and close the opening, and a controllable access aperture at least a portion, or all, of which is spaced from the opening through which to selectively remove a clean, reusable medical gown such as by a medical practitioner within the healthcare facility.

In accordance with another aspect of the present invention, the loaded dispensing container may be transported to or around the healthcare facility and placed where needed for ready access at the point-of-use to clean, reusable medical gowns through the controllable access aperture. As a result, the reusable medical gowns do not need to be manually handled in loose groups for dispensing and may also not need to be manually handled in loose groups for distribution. Instead, a group of clean, reusable medical gowns are loaded into and held together in the dispensing container which is then easily distributed to and/or around a healthcare facility. As a consequence, the drawbacks previously associated with reusable medical gowns are overcome such that, in the view of the healthcare facility, they are as convenient and easy to handle as disposable medical gowns. The healthcare facility will thus be encouraged to provide reusable medical gowns, enjoying the long term cost savings and other advantages provided thereby.

In one embodiment, the dispensing container may be a flexible bag in which the sidewall structure is comprised of liquid resistant fabric formed into a tube to define a tunnel shape thereto, but which can be collapsed when empty into a generally flat configuration or even balled or rolled up as desired. The fabric may also be launderable such that the flexible bag is also reusable through laundering. With the flexible bag embodiment, the opening is an open end of the bag, with the closure being a hood advantageously of the same fabric and secured to or forming part of the sidewall structure. The hood can be repeatably manipulated between an open state in which the opening is exposed for loading of clean, reusable medical gowns into the bag after being, and/or to cause the bag to become, un-collapsed, and a closed state which obstructs the opening, such as to help keep the loaded gowns within the bag. The first controllable access aperture may be an elasticized opening in the sidewall structure, such as at the opposite end of the bag, and through which a medical practitioner may selectively remove a clean, reusable medical gown for use such as in the healthcare facility. A drawstring may be provided to selectively close the elasticized opening, such as during transportation and/or distribution, or at other times as may be desired such as between dispensing activities.

To facilitate loading into and dispensing of clean, reusable medical gowns from the dispensing container, the flexible bag is advantageously provided with two pairs of spaced-apart hanging straps associated with the opening end of the bag. One pair of straps is accessible in at least the open state of the hood and can be used to vertically suspend the bag with the opening at a level to facilitate loading of clean, reusable medical gowns into the bag. After filling the bag to the extent desired with clean, reusable medical gowns, the hood may be manipulated into the closed state. The second pair of straps is accessible in at least that closed state and may be used, such as at the healthcare facility, to suspend the bag from a wall or building door, for example, with the elasticized opening at a level facilitating ready access thereto by medical practitioners for dispensing of the clean, reusable medical gowns.

After all of the clean, reusable medical gowns have been dispensed from the flexible bag, the flexible bag may be sent for laundering and refilling. In that regard, the hood will be manipulated back to the open state for filling and manipulated again to the closed state as above described.

In other embodiments, the dispensing container may be a paperboard box in which the sidewall structure includes four contiguous, generally solid, planar paperboard walls foldably interconnected so as to be collapsible by folding and erected by unfolding. The contiguous walls are, in sequence, a first main or top wall, a first side wall, a second main or bottom wall, and a second side wall. When folded, each of the main walls and a respective one of the adjacent side walls defines a respective pair of flat, generally planar webs, with the webs being in parallel relationship so as to be generally confronting, and possibly contacting.

One end of the paperboard box includes a plurality of generally solid, planar paperboard flap segments foldably interconnected to various of the main and/or side walls. The flap segments are arranged to be interleaved and folded such that erecting the paperboard box causes the flap segments to unfold into an effective transverse wall which spans to close off that end of the paperboard box. The other end of the paperboard box, when erected, defines the opening, which may span the entirety of that end of the paperboard box. The closure may be a generally solid, planar paperboard lid wall foldably interconnected to one of the four contiguous walls, advantageously one of the main walls, so as to be repeatably manipulatable between the open and closed states. When the paperboard box is collapsed, the lid wall will also be coplanar with one of the pairs of webs. The first controllable access aperture is a first perforated section of at least a portion of one of the four contiguous walls, advantageously, the top wall, and is normally intact so as to obstruct access to the interior therethrough, but being removable to permit access to the interior therethrough.

When erected, the main walls are spaced apart, the side walls are transverse thereto and spaced apart, and the flap segments and opening are spaced apart, all of which cooperate to define therebetween an interior that is generally rectangular in cross-section. The main walls are each advantageously larger in area than any of the side walls, the interleaved flap segments, or the lid wall. The side walls, interleaved flap segments, and lid wall advantageously have a height between the main walls that is less than the length or width of the main walls. As a result, with the paperboard box erected, the main walls are spaced closer together than are either the side walls on the one hand or the interleaved flap segments and the lid wall on the other hand, to thus provide a relatively low profile to the paperboard box when lying down (i.e., with the top or bottom wall facing upwardly) as compared to when standing up (i.e., with one of the side walls or the lid wall facing upwardly).

With the paperboard box erected, and the first perforated section still intact, the lid wall is folded or extends out of the way of the opening to expose the opening for loading of clean, reusable medical gowns into the interior of the erected paperboard box through the opening. After filling the paperboard box to the extent desired with clean, reusable medical gowns, the lid wall may be manipulated, such as by folding, into the closed position in which the lid wall spans across and obstructs the opening, such as to help keep the loaded gowns within the paperboard box. The opening may also include along adjacent aspects of some of the walls, end flaps to underlie the lid wall in the closed state, and the lid wall and one of the four contiguous walls may also be provided with a locking tab receivable in a cut through associated with the lid wall to help hold the lid wall in the closed state.

In the healthcare facility, the first perforated section may be removed so that clean, reusable medical gowns may be selectively removed from the box for use. After use, the paperboard box may be disposed of, but is advantageously first collapsed, such as by manipulating the lid wall back into the open state, and then folding down the four contiguous walls into the coplanar webs described above, while also folding up the flap segments in the otherwise normally closed end.

In some embodiments of paperboard box dispensing containers, a second controllable access aperture is defined by a second perforated section of at least a portion of the another one of the walls, advantageously one of the side walls or the lid wall. By way of example, an embodiment of paperboard box dispensing container is sized to fit within the drawer of an isolation cart with the lid wall confronting the drawer front. In that embodiment, the side and lid walls are no taller than the interior space of the drawer, and the main walls are no larger than the space available within the drawer as defined by the bottom of the drawer. The second perforated section thereof may be associated with that confronting lid wall and contiguous through a junction with the first perforated section, such as of the top wall, such that upon removal of both perforated sections, access is provided into the interior of the paperboard box for removal of a clean, reusable medical gown therefrom. A clean, reusable medical gown may be removed from the isolation cart at the point-of-use by opening the drawer sufficiently to expose the junction and to allow a hand to reach in to grasp a gown from the box. After use, the empty paperboard box may be removed from the drawer and replaced with another paperboard box loaded with clean, reusable medical gowns, and from which the first and second perforated sections have been removed. The empty paperboard box is advantageously collapsed, such as by manipulating the lid wall back into the open state and folding down the four contiguous walls into the coplanar webs described above, while also folding up the flap segments in the otherwise normally closed end, and disposed of.

In another embodiment of paperboard box dispensing container, the first and second perforated sections are spaced apart and separately removable to facilitate dispensing of clean, reusable medical gowns from the paperboard box at the point-of-use either in a lying down orientation with the top wall facing upwardly (and the bottom wall facing downwardly) by removal of the first perforated section in the top wall, or in a standing-up orientation with the side wall containing the second perforated section facing upwardly by removal of the second perforated section.

To facilitate use of an embodiment of paperboard box dispensing container with spaced apart first and second perforated sections in the healthcare facility, a supporting box may be provided and into which a loaded dispensing container may be removably inserted for use, and then removed after being emptied, for replacement with another loaded dispensing container. The dispensing box has spaced apart rigid main walls interconnected by a pair of spaced apart rigid side walls and a third rigid side wall extending between the pair of spaced apart rigid side walls. The rigid main walls and side walls cooperate to define a container receiving space therebetween. The third rigid side wall is advantageously connected to the pair of rigid side walls such that the three rigid side walls are contiguous. An opening into the container receiving space is defined along a fourth side between two of the oppositely disposed rigid side walls, such as by absence of a rigid wall therealong. The dispensing container may be inserted into the container receiving space of the supporting box through that opening with its top and bottom walls generally parallel to the main walls of the supporting box, and with its respective side walls confronting respective ones of the pair of rigid side walls of the supporting box.

One of the main walls of the supporting box has an aperture sized to match up with the first perforated section of the dispensing container. To dispense clean, reusable medical gowns from the dispensing container in the lying down position, the rigid main wall with the aperture is also positioned to face upwardly. Clean, reusable medical gowns may thus be selectively removed from the dispensing container at the point-of-use through the aperture in the rigid main wall with the first perforated section having been removed from the dispensing container therein. One of the pair of rigid side walls of the supporting box also has an aperture sized to match up with the second perforated section of the dispensing container. To dispense clean, reusable medical gowns from the dispensing container in the standing-up position, the rigid side wall with the aperture is also positioned to face upwardly. Clean, reusable medical gowns may thus be selectively removed from the dispensing container through the aperture in the rigid side wall with the second perforated section having been removed from the dispensing container therein.

One of the main walls of the supporting box, such as the rigid main wall that does not have the aperture, may be provided with a plurality of outwardly projecting resilient members. The resilient members may provide a cushion for the supporting box when set on a horizontal surface for dispensing clean, reusable medical gowns in the lying down position. The resilient members may be suction cups so as to hold the supporting box in place on the horizontal surface. The resilient members may also be used to provide a cushion and/or hold the supporting box in place against a vertical surface, such as the side wall of an isolation cart, when dispensing clean, reusable medical gowns in the standing-up position. That same main wall may also include a slot adapted to receive a hangar hook by which to suspend the supporting box along the vertical surface such as from the edge or side handle of an isolation cart. After use, the empty paperboard box is removed, and replaced with another paperboard box loaded with clean, reusable medical gowns and from which the desired perforated section has been or will be removed. The empty paperboard box may then be collapsed and disposed of.

In yet another embodiment of paperboard box dispensing container, the first perforated section may be in the top wall adjacent to one end of the paperboard box, advantageously the normally closed end defined by the interleaved flap segments so as to be disposed at the end opposite the opening end, and sized to extend generally between the side walls of the paperboard box extending from the adjacent end of the paperboard box. The first perforated section thus may be seen as extending along a lower aspect of the dispensing container when the dispensing container is held with the adjacent end facing downwardly, which advantageously also positions the lid wall and opening end to face upwardly.

To facilitate use of this embodiment of paperboard box dispensing container, a supporting box may be provided and into which a loaded dispensing container may be removably inserted for use, and then removed after being emptied, for replacement with another loaded dispensing container. To that end, the supporting box has a rigid back wall and four rigid side walls defining a rectangle extending therefrom. The rigid side walls are advantageously contiguous. The rigid back wall and side walls collectively define a container receiving space. A door is coupled to at least one of the rigid side walls through which to selectively gain access to the container receiving space. The back wall includes at least one slot adapted to receive a hangar clip by which to suspend the supporting box against a vertical surface, such as against a building door, with the back wall confronting and adjacent to the vertical surface and the door of the supporting box facing outwardly and with one of the rigid side walls facing downwardly such that the adjacent edge of the supporting box door is a lower edge. The back wall of the supporting box may also include a projecting resilient member to cushion the back wall against the vertical surface and, advantageously, may be a suction cup to hold the supporting box in place therealong.

An aperture is defined along the lower edge of the door, such as in the door just above the lower edge, or in a gap between that lower edge and the downwardly facing rigid side wall. The aperture is sized and positioned to mate with the first perforated section in the top wall of the dispensing container which is to be loaded into the container receiving space accordingly. The door of the supporting box can be manipulated, such as by pivoting about a hinge along one of the rigid side walls, between an open state with access to the container receiving space for insertion of the dispensing container therein and a closed state which holds the dispensing container in place therein. With the dispensing container therein and positioned to align the area of the first perforated section with the aperture, the first perforated section having been or being removed, and the door closed, clean, reusable medical gowns may be selectively dispensed from the dispensing container in the supporting box through the opening. After use, the door is opened, and the empty paperboard box removed, collapsed and disposed of, and replaced with another paperboard box loaded with clean, reusable medical gowns, the first perforated section thereof removed, and the door closed to keep that paperboard box in place aligned to the aperture of the supporting box for dispensing clean, reusable medical gowns.

With the foregoing dispensing containers according to the present invention, clean, reusable medical gowns may be loaded into the dispensing container and transported to or around the healthcare facility and placed where needed for ready access to clean, reusable medical gowns, without the need to be manually handled in loose groups once in dispensing container. To that end, and in accordance with other principles of the present invention, a dispensing container and a plurality of clean, reusable medical gowns are obtained, and the gowns loaded into the dispensing container through the opening with closure in an open state. The closure is then manipulated into the closed state for delivery or transport to or around the healthcare facility. The loaded dispensing container is then used to selectively dispense clean, reusable medical gowns through a controllable access aperture thereof. The controllable access aperture may be an elasticized opening with a drawstring holding it closed, in which case the drawstring is loosened to open up the elasticized opening for dispensing. Where the controllable access aperture is a perforated section, the perforated section is removed to facilitate dispensing of the gowns. Where a supporting box is to be used, the loaded dispensing container is loaded into the supporting box and gowns then dispensed through a mating aperture thereof.

Advantageously, soiled reusable medical gowns are obtained from one or more healthcare facilities and laundered so as to have clean, reusable medical gowns for loading a plurality thereof into a dispensing container. The clean, reusable medical gowns may be loaded into the dispensing container at a laundry facility and delivered to a healthcare facility therein for distribution, or the clean gowns may be delivered in bulk and loaded into dispensing containers at the healthcare facility for subsequent distribution. As a result, the reusable medical gowns do not need to be manually handled in loose groups for dispensing at the point-of-use, and may also not need to be manually handled in loose groups for distribution. Instead, a group of clean, reusable medical gowns are loaded into and held together in the dispensing container which is then easily distributed to and/or around a healthcare facility.

By virtue of the foregoing, the drawbacks previously associated with reusable medical gowns are overcome such that, in the view of the healthcare facility, they are as convenient and easy to handle, store, distribute, and use as disposable medical gowns. The healthcare facility will thus be encouraged to provide reusable medical gowns preferred by medical practitioners while enjoying the long term cost savings and other advantages provided thereby. These and other advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

FIG. 3 is perspective view of the dispensing container of FIG. 1 with the closure in the open state ready for loading of clean, reusable medical gowns;

FIG. 4 is a perspective view of the dispensing container of FIG. 1 loaded with clean, reusable medical gowns and with the closure in the closed state;

FIG. 23 is a is a plan view of a paperboard blank for a fourth embodiment of a dispensing container for clean, reusable medical gowns in the form of a paperboard box in accordance with the principles of the present invention;

FIG. 24 is a partially broken away plan view of the assembled, collapsed, empty dispensing container of FIG. 23;

DETAILED DESCRIPTION OF THE DRAWINGS

Figure 1:
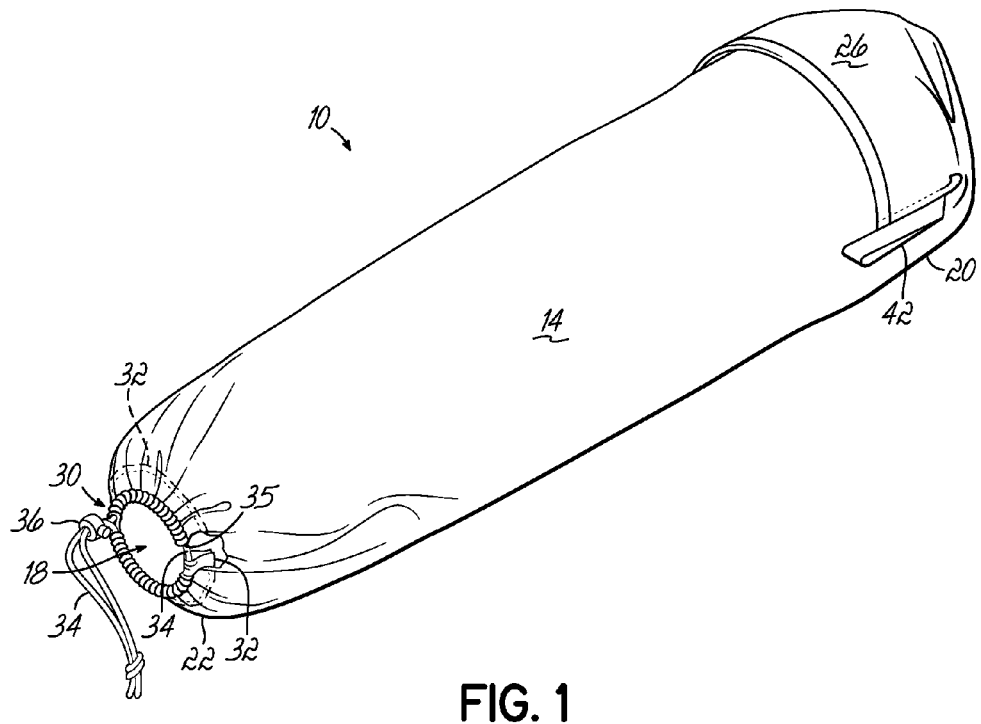
FIG. 1 is a perspective, partially broken away view of a first embodiment of a dispensing container for clean, reusable medical gowns in the form of a flexible bag in accordance with the principles of the present invention showing the dispensing container un-collapsed or erected, and with the closure in the closed state.

With reference to FIGS. 1 through 5, there is shown a first embodiment of a dispensing container 10 for loading with a plurality of clean, reusable medical gowns 12 (FIG. 3) in accordance with the principles of the present invention. For sake of clarity, only one gown 12 is shown in FIG. 3, but it will be appreciated that a plurality of such gowns 12 are typically involved. Dispensing container 10 is in the form of a flexible bag having a sidewall structure 14 comprised of liquid resistant, flexible fabric such as polyester, nylon, or other generally slick, liquid resistant fabric so as to render the dispensing container 10 reusable through laundering. Sidewall structure 14 defines an interior 18 of the dispensing container 10 between a first end 20 and a second end 22 thereof. A hemmed opening 24 (FIG. 3) is associated with the first end 20 and communicates into the interior 18. A closure 26 in the form of a hood is also associated with the first end 20. The closure 26 may be of the same fabric as the sidewall structure 14 and may be associated with the first end 20 either as an integral extension of, or an added piece sewn to, the sidewall structure 14.

Figure 2:
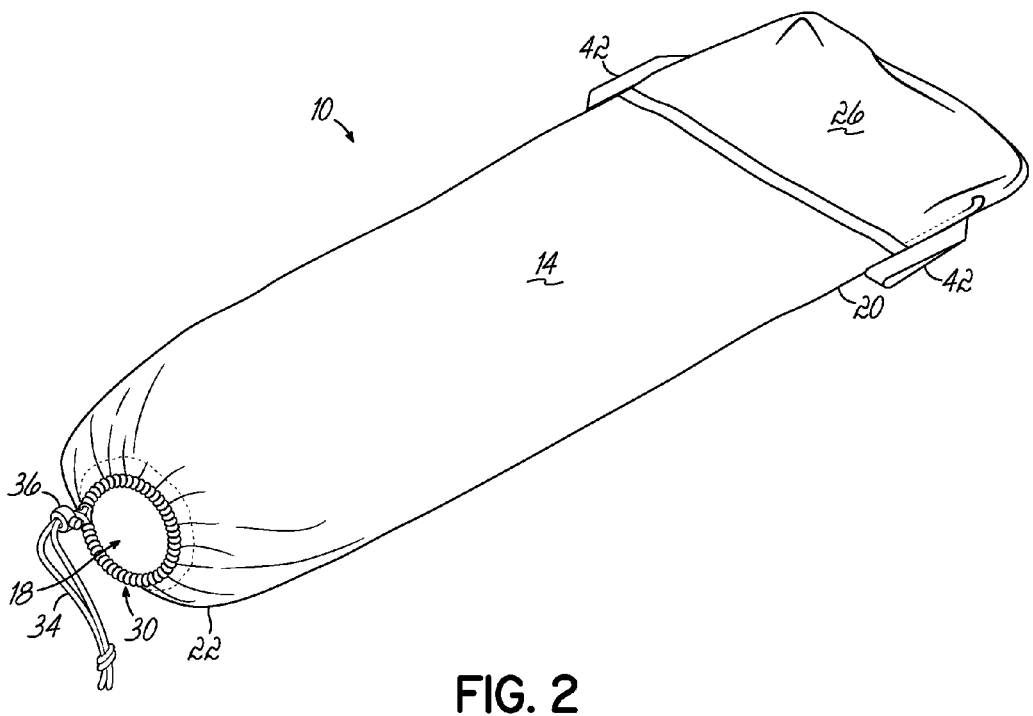
FIG. 2 is a view of the dispensing container of FIG. 1 showing the dispensing container empty and collapsed.
Figure 5:
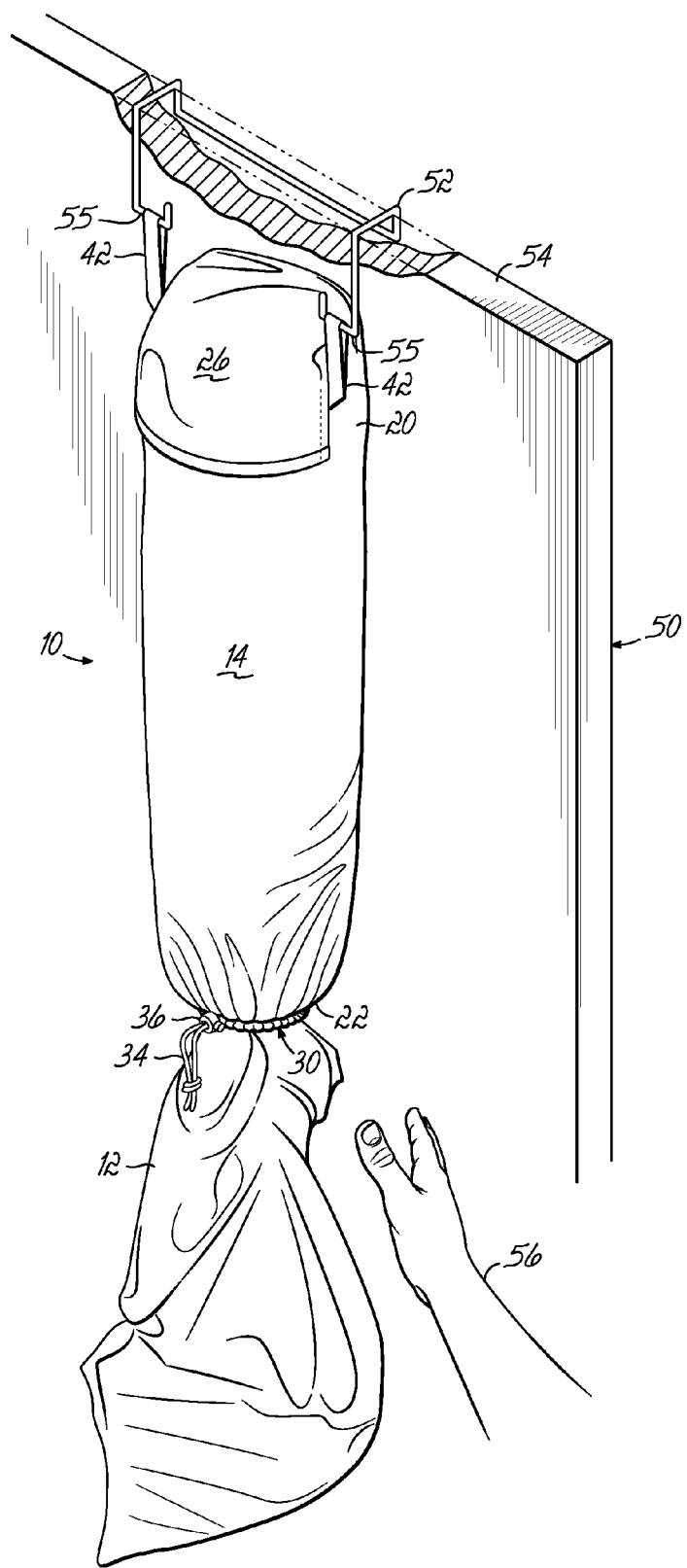
FIG. 5 is a perspective view of the loaded dispensing container of FIG. 4 suspending from a building door for purposes of illustrating dispensing of a clean, reusable medical gown in accordance with the principles of the present invention.

The fabric sidewall structure 14 is flexible such that the dispensing container 10 may be collapsed into a flat condition as shown in FIG. 2, or even balled or rolled up as desired (not shown), so as to collapse the interior 18, but can also be un-collapsed or erected to expand the interior 18 and define a generally tubular shape to the dispensing container 10, as seen, by way of example, in FIG. 3. The closure 26 is repeatedly manipulatable or movable as indicated by arrow 27 between an open state as shown in FIG. 3 in which the opening 24 is exposed for loading of clean, reusable medical gowns 12 into the interior 18 as indicated by arrow 28, and a closed state as shown in FIG. 4 in which the closure 26 obstructs the opening 24, such as to help keep the loaded gowns 12 within the dispensing container 10.

The dispensing container 10 also includes at least a first controllable access aperture 30 communicating with the interior 18 and spaced from the first end 20 and the associated opening 24. The first controllable access aperture 30 is advantageously associated with the sidewall structure 14, such as at the second end 22 of the sidewall structure 14. In the embodiment of dispensing container 10 shown here, first controllable access aperture 30 includes an elastic 32 (FIG. 1) advantageously secured, such as by stitching, about the end 22 so as to define the first controllable access aperture 30 as an elasticized opening. The elasticized opening 30 is sized to generally hold clean, reusable medical gowns 12 within the interior 18, but to allow at least one gown 12 to be selectively removed from the interior 18 through the first controllable access aperture 30. A drawstring 34 may be provided, such as within an annular pocket 35 associated with the elasticized opening 30, and extending out from the pocket 35. The annular pocket 35 may be formed by folding the end 22 with the elastic 32 over the drawstring 34 and stitching the pocket 35 closed thereabout. The drawstring 34 can be used to close down the elasticized opening 30, such as during transportation and/or distribution, or at other times as may be desired between dispensing activities. A barrel lock 36 is selectively slidable along the drawstring 34 to hold the elasticized opening 30 closed if desired.

To facilitate loading into and dispensing of clean, reusable medical gowns 12 from the dispensing container 10, two pairs of spaced-apart hanging straps 40, 42 are provided associated with the opening 24, with pair 40 being accessible in at least the open state of the closure 26 (FIG. 3) and the pair 42 being accessible in at least the closed state of the closure 26 (FIG. 4), although the pair 42 may also be at least partially accessible in the open state of the closure 26 as well (FIG. 3). With particular reference to FIG. 3, the pair 40 of hanging straps may be used to vertically suspend dispensing container 10, such as by a pair of hook ends 44 to position the opening 24 at a level to facilitate loading of the clean, reusable medical gowns 12 into the dispensing container 10 through the opening 24.

In the example shown in FIG. 3, a dispensing container 10 is obtained and, with the closure 26 in, or manipulated into, the open state, the opening 24 is held relative to a flat surface 46, such as of a working table, whereby a worker (not shown) may push the gowns 12, one by one or in groups, into the interior 18 through the opening 24. As will be appreciated, dispensing container 10 may first be un-collapsed and/or will un-collapse on its own as the gowns 12 are loaded therein. After filling the dispensing container 10 to the extent desired with clean, reusable medical gowns 12, the closure 26 may be manipulated into the closed state exemplified in FIG. 4. Advantageously, the dispensing container 10 is also removed from the hook ends 44.

The pair 42 of hanging straps facilitates dispensing of clean, reusable medical gowns 12 from dispensing container 10. In that regard, and with further reference to FIG. 5, the dispensing container 10 may be suspended vertically, such as from a building door 50 by a hook 52 mounted over the top 54 of the door 50. Respective hook ends 55 of the hook 52 receive respective ones of the straps 42 so as to advantageously suspend the dispensing container 10 from the door 50 with the elasticized opening 30 positioned at a level, such as at the normal level of a medical practitioner's hand 56, to facilitate ready access thereto for dispensing of the clean, reusable medical gowns 12. After all of the gowns 12 have been dispensed from the suspended dispensing container 10, the dispensing container 10 may be removed from the hook 52 and collapsed and sent for laundering and refilling with additional clean, reusable medical gowns 12 (in which the closure 26 will be manipulated back to the open state for filling and manipulated again to the closed state as above-described).

The sidewall structure 14 of the dispensing container 10 may have a length of about 31 to 34½ inches, with the interior 18 having a maximum diameter of about 15 to 17 inches. The hanging straps of the pairs 40, 42 may be formed by respective 13½ inch lengths of 1¼ inch twill tape looped over and stitched to the fabric of the sidewall structure 14, with the pair 40 being stitched about one-half inch below the opening 24 on top of the hood 26, and the pair 42 being stitched about 4½ inches below the opening 24 under the hood 26.

Figure 9:
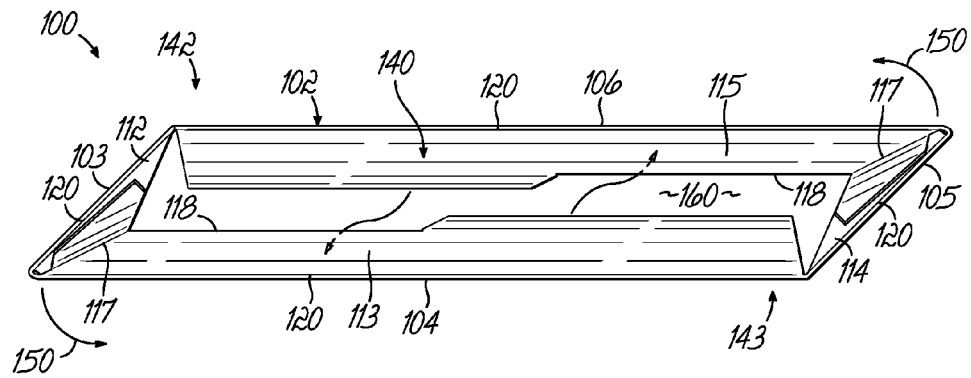
Figure 10:
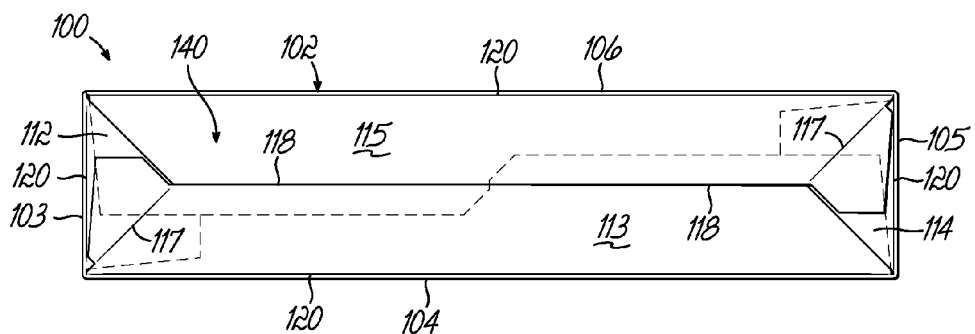
Figure 11:
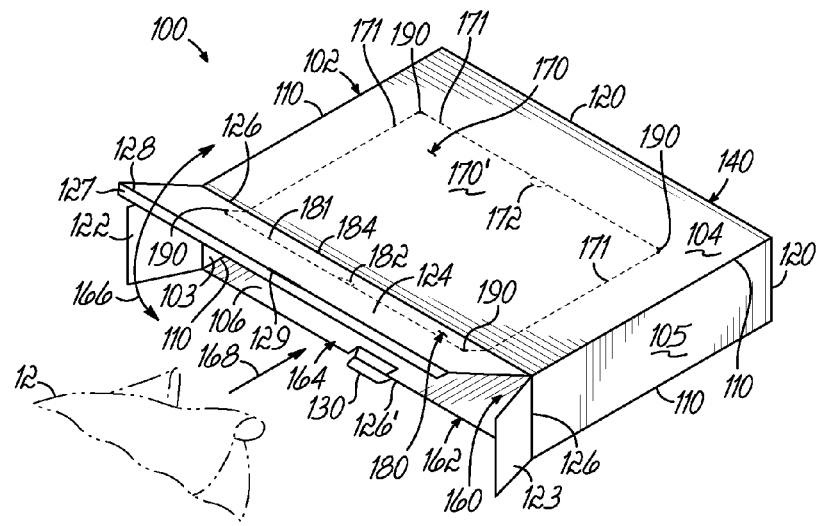
FIG. 11 is a perspective view of the un-collapsed or erected assembled dispensing container of FIG. 7 with the perforated sections intact and the closure in the open state ready for loading of clean, reusable medical gowns.

With reference to FIGS. 6 through 13 there is shown a second embodiment of a dispensing container 100 for loading with a plurality of clean, reusable medical gowns 12 (FIG. 11) in accordance with the principles of the present invention. For sake of clarity, only one gown 12 is shown in FIG. 11, but it will be appreciated that a plurality of such gowns 12 are typically involved. Dispensing container 100 is in the form of a paperboard box made from a blank 101 (FIG. 6) having a sidewall structure 102 comprised of four contiguous, generally solid, planar paperboard walls being in sequence, a first side wall 103, a main or top wall 104, a second side wall 105, and a second main or bottom wall 106. The walls 103, 104, and 105 are foldably interconnected as along respective folding scores 110. Interconnected to the bottom wall 106 is a further wall segment 107 along another folding score 110. The sidewall structure 102 also includes generally solid, planar paperboard flap segments 112, 113, 114, and 115 which are foldably interconnected to the respective walls 103, 104, 105, and 106 along a folding score 120. The flap segments 113 and 115 also include angled folding scores 117 and offset segments 118, which facilitate interleaving of the flap segments 112, 113, 114, and 115 as hereinafter described. The sidewall structure 102 also includes generally solid, planar paperboard end flaps 122, 123 and a lid wall 124 foldably interconnected to the respective walls 103, 105, and 104 along a folding score 126. The lid wall 124 may have a tuck section 127 foldably interconnected thereto along a folding score 128, a portion of which may be cut through as at 129 to receive a locking tab 130 associated with the wall 106.

Figure 7:
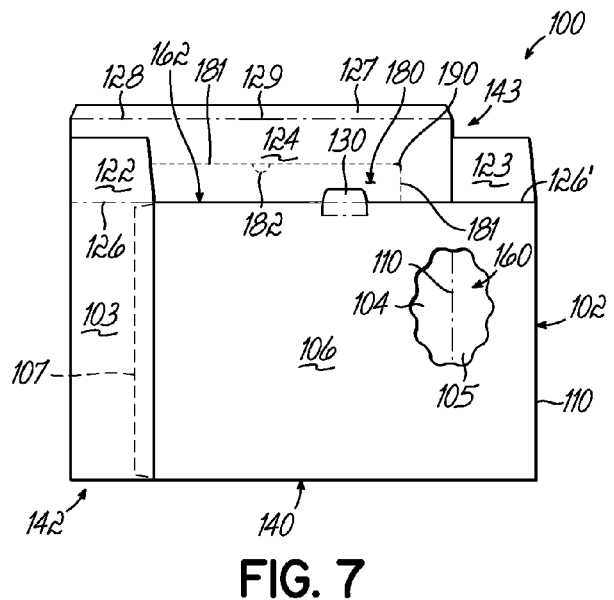
FIG. 7 is a partially broken plan view of the assembled, collapsed, empty dispensing container of FIG. 6.
Figure 8:
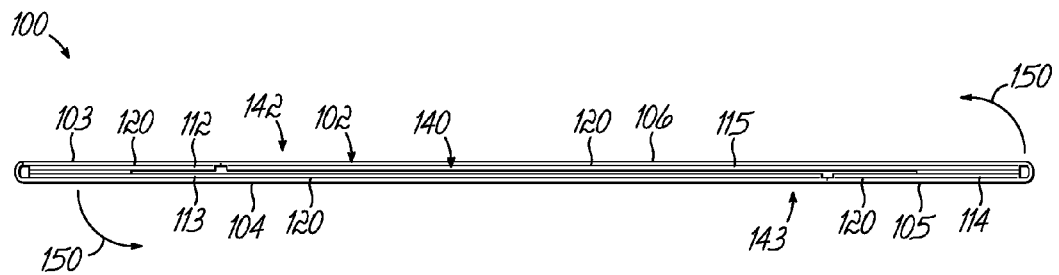
FIGS. 8-10 are end views of the assembled dispensing container of FIG. 7 for purposes of describing the process of un-collapsing or erecting the dispensing container.

To form the dispensing container 100 from the blank 101, the walls 103, 104, 105, and 106 are folded into a generally rectangular shape such that the main walls 104, 106 are spaced apart and the side walls 103, 105 are spaced apart and transverse to the main walls 104, 106. The wall segment 107 is adhered to the wall 103. The flap segments 112, 113, 114, and 115 are folded along the folding scores 120 and 117, and the flap segments 112 and 114 adhered to the flap segments 113 and 115 to butt up to the folding scores 117 so as to interleave them such that the offset segments 118 will interlock with the dispensing container 100 erected as exemplified in FIGS. 8 through 10, so as to unfold and span to close off an end 140 of the dispensing container 100 defined across the folding score 120. With the dispensing container 100 folded up or collapsed as shown in FIGS. 7 and 8, the first side wall 103, associated end flap 122, bottom wall 106, and associated locking tab 130 define a flat, generally planar web 142, while the second side wall 105, associated end flap 123, top wall 104, and associated lid wall 124 and tuck section 129 define a flat, generally planar web 143, with the webs 142 and 143 being in generally parallel relationship so as to be generally confronting, and possibly contacting. The flap segments 112, 113, 114, and 115 are folded between the webs 142 and 143 as seen in FIG. 8.

Figure 12A:
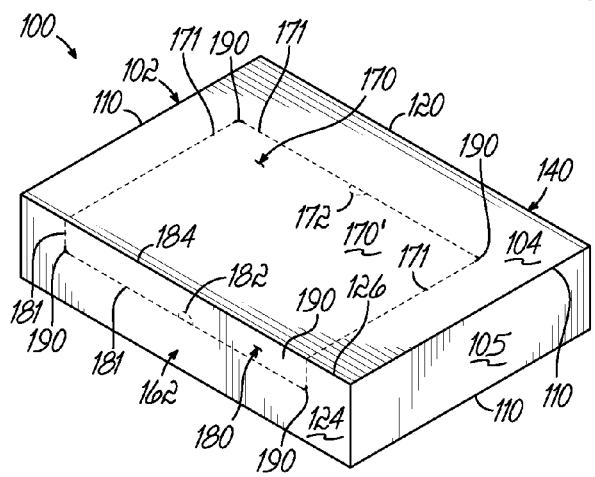
FIGS. 12A and 12B are perspective views of the un-collapsed or erected assembled dispensing container of FIG. 7 loaded with clean, reusable medical gowns, with the perforated sections intact and the closure in the closed state.
Figure 12B:
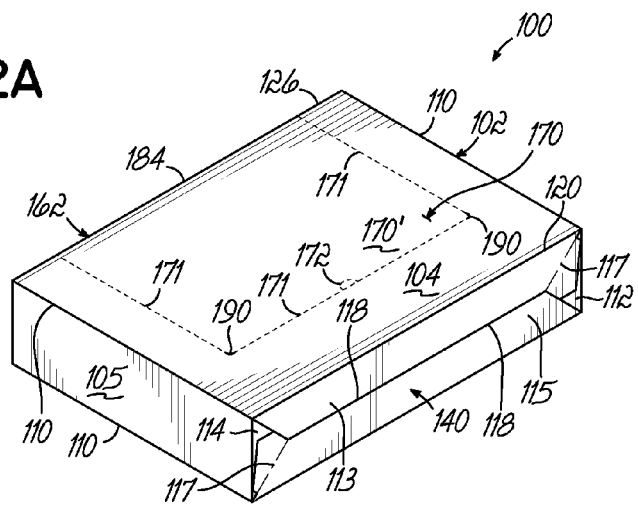

A dispensing container 100 may be obtained in the folded or collapsed state. As the dispensing container 100 is erected as indicated by the arrows 150 in FIGS. 8 and 9, the flap segments 112, 113, 114, and 115 will begin to unfold with the offset segments 118 aligned to receive opposing portions of the flap segments 113 and 115 as seen in FIG. 9. Continued unfolding along the arrows 150 causes the flap segments 112, 113, 114, and 115 to become generally coplanar so as to present the effect of a transverse wall that spans and normally closes off the end 140 of the dispensing container 100 as seen in FIGS. 10 and 12B. As unfolded or erected, the dispensing container 100 defines an interior 160 between the end 140 and a first end 162 thereof opposite to the end 140 and defined along the folding score 126 and the continuous edge 126' of the bottom wall 106. The first end 162 defines an opening 164 communicating with the interior 160 as seen in FIG. 11. The lid wall 124 defines a closure and is repeatedly manipulatable or foldable as indicated by the arrow 166 (FIG. 11), such as by folding along the folding score 126, between an open state as shown in FIG. 11 in which the opening 164 is exposed for loading of clean, reusable medical gowns 12 into the interior 160 as indicated by the arrow 168, and a closed state as shown in FIG. 12A in which the lid wall 124 obstructs the opening 164, such as to help keep the loaded gowns 12 within the dispensing container 100.

With the lid wall 124 in the open state and the dispensing container 100 erected as shown in FIG. 11, a worker (not shown) may push the gowns 12, one by one or in groups, into the interior 160 through the opening 164. After filling the dispensing container 100 to the extent desired with clean, reusable medical gowns 12, the lid wall 124 may be manipulated into the closed state exemplified in FIG. 12A, by folding over the end flaps 122 and 123, and then folding over the lid wall 124 to span across the opening 164 and folding the tuck portion 129 in behind the bottom wall 106. The locking tab 130, if provided, may be folded over and inserted into the cut through 129 to secure the lid wall 124 in the closed state.

The dispensing container 100 also includes at least a first controllable access aperture 170 communicating with the interior 160 and at least a portion 170' of which (FIG. 11) is spaced from the first end 162 and the associated opening 164. The first controllable access aperture 170 is advantageously associated with the top wall 104 of the sidewall structure 102. In the embodiment of dispensing container 100 shown here, the first controllable access aperture 170 is defined by a perforation 171 extending from and back to the folding score 126 so as to define the first controllable access aperture 170 as a first, generally square or rectangular perforated section. The first perforated section 170 is normally intact with the top wall 104 so as to obstruct access to the interior 160 of the dispensing container 100 therethrough, but is removable, such as by tearing along the perforation 171, to permit access to the interior 160 therethrough whereby to dispense clean, reusable medical gowns 12 therefrom. A cutout 172 may be provided along the perforation 171 by which to facilitate entry of a user's finger or thumb (not shown) in order to facilitate removal of the first perforated section 170.

Advantageously, dispensing container 100 includes a second controllable access aperture 180 associated with the lid wall 124. To that end, the second controllable access aperture 180 is defined by a perforation 181 extending from and back to the folding score 126 so as to define the second controllable access aperture 180 as a second, generally rectangular perforated section. Second perforated section 180 is normally intact with the lid wall 124 so as to obstruct access to the interior 160 of the dispensing container 100 therethrough, but is removable, such as by tearing along the perforation 181, to permit access to the interior 160 therethrough whereby to dispense clean, reusable medical gowns 12 therefrom. A cutout 182 may be provided along the perforation 181 by which to facilitate entry of a user's finger or thumb (not shown) in order to facilitate removal of the second perforated section 180.

Figure 13:
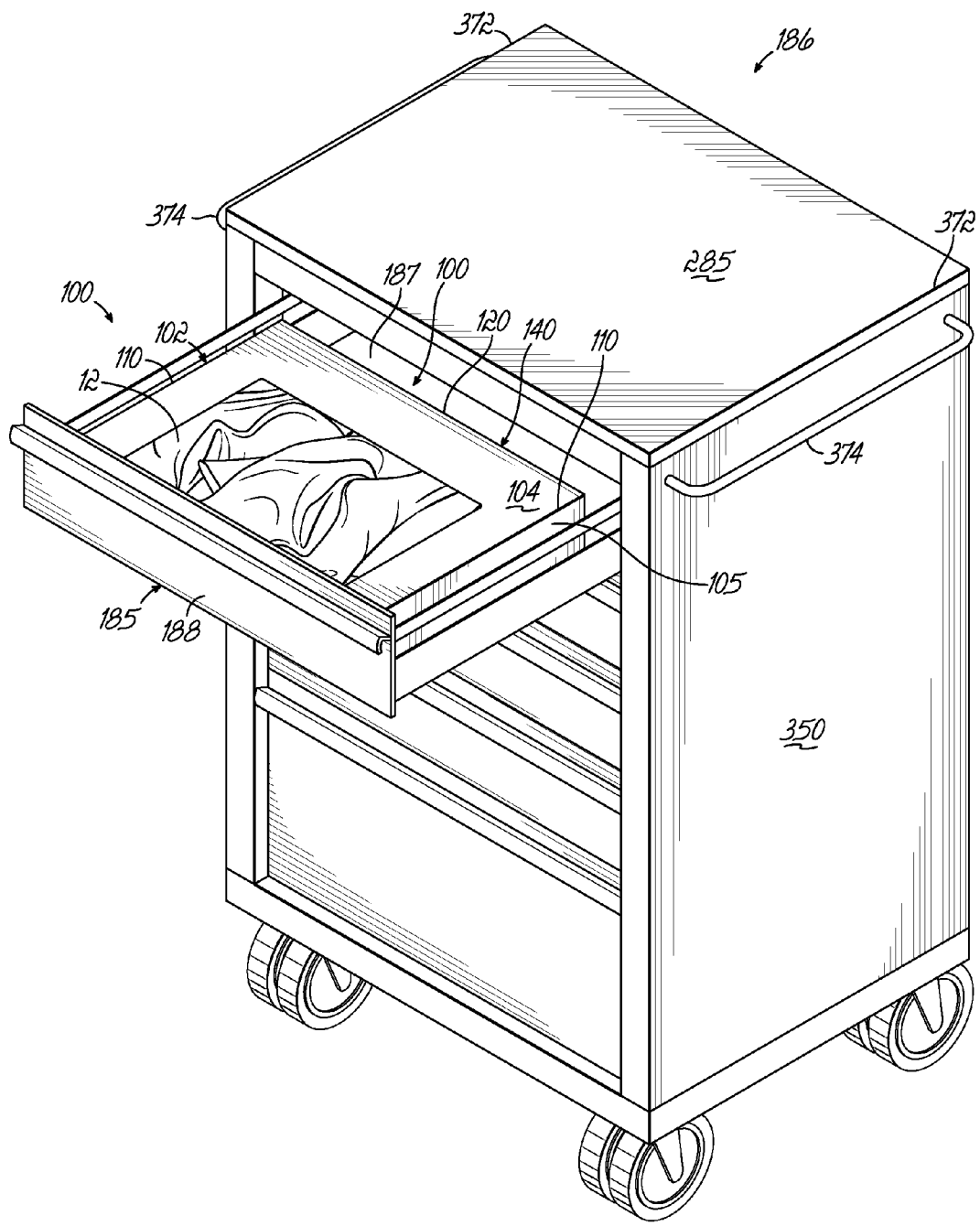
FIG. 13 is a perspective view of an isolation cart with the dispensing container of FIGS. 12A and 12B in an open drawer thereof and the perforated sections removed for purposes of illustrating dispensing of a clean, reusable medical gown in accordance with the principles of the present invention.
Figure 14:
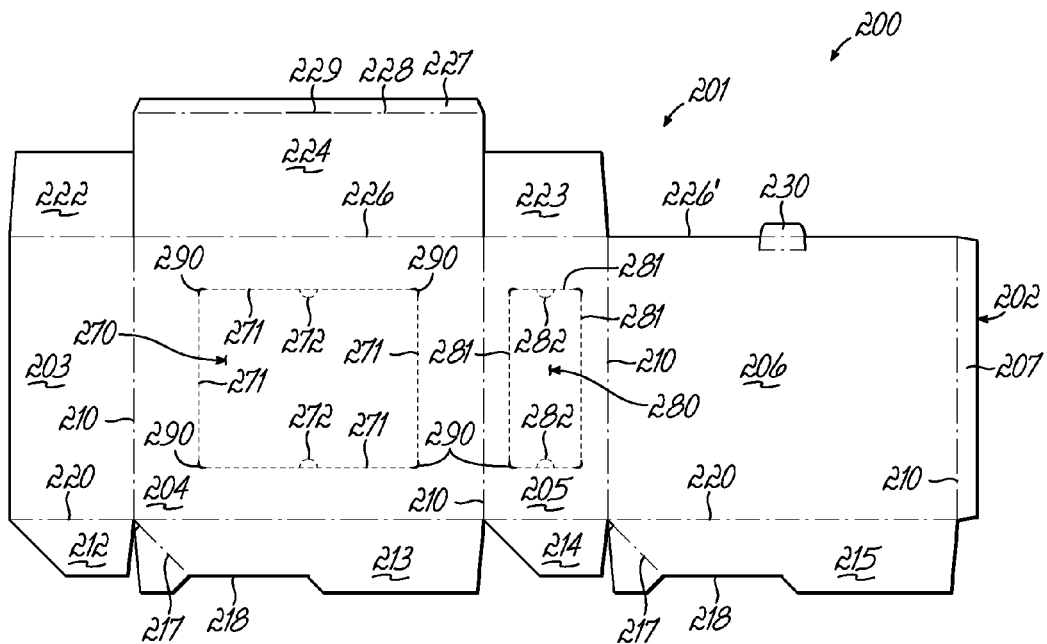
FIG. 14 is a is a plan view of a paperboard blank for a third embodiment of a dispensing container for clean, reusable medical gowns in the form of a paperboard box in accordance with the principles of the present invention.

The first and second perforated sections 170 and 180 of the dispensing container 100, and their respective perforations 171, 181, are contiguous and share the folding score line 126 which defines a junction 184 therebetween. Advantageously, the sidewalls 103 and 105, as well as the lid wall 124 and when interleaved the flap segments 112, 113, 114, and 115, are sized so as to define a height, such as about four inches, that will fit within the drawer 185 of an isolation cart 186 (FIG. 13). Similarly, the main walls 102, 104 are advantageously sized no larger than the drawer 185 as defined by the bottom 187 thereof. By way of example, the main walls 102, 104 may define approximately 18 by 12 inch rectangles. A user (not shown) will remove both first and second perforated sections 170 and 180 from a loaded dispensing container 100, and place the loaded dispensing container 100 into the drawer 185 with the bottom wall 106 confronting the drawer bottom 187 and the lid wall 124 confronting, and adjacent or slightly spaced from, the drawer front 188 of the drawer 185. A clean, reusable medical gown 12 may thus be removed from the isolation cart 186 at the point-of-use such as by opening the drawer 185 sufficiently to expose the junction 184 and allow a medical practitioner's hand 56 to reach in to grasp a gown 12 from the dispensing container paperboard box 100. It will be appreciated, however, that during loading of the gowns 12 into the erected dispensing container 100 as discussed above in connection with FIG. 11, the perforated sections 170 and 180 are each advantageously kept intact.

Figure 6:
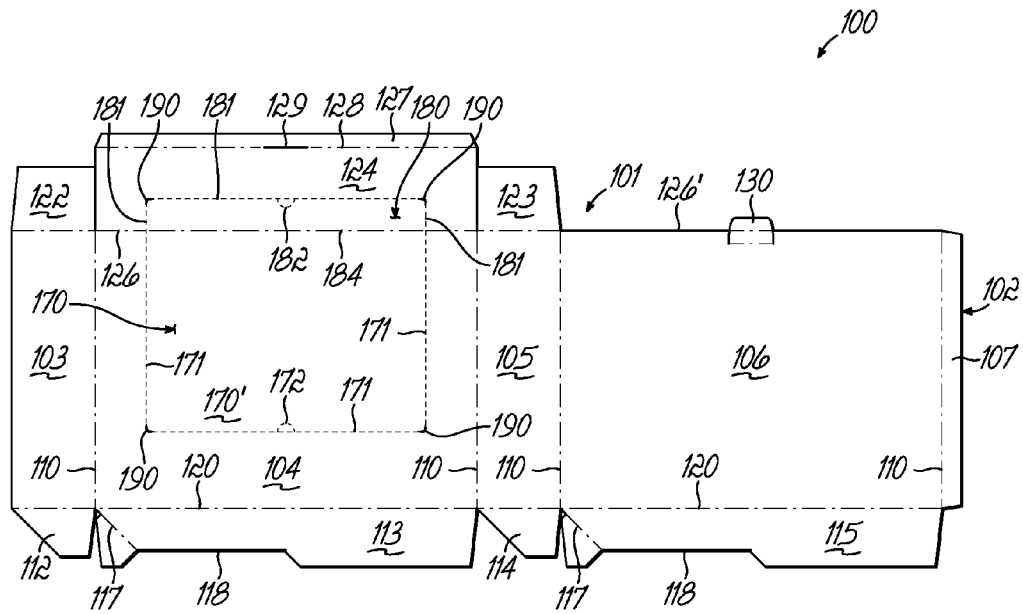
FIG. 6 is a plan view of a paperboard blank for a second embodiment of a dispensing container for clean, reusable medical gowns in the form of a paperboard box in accordance with the principles of the present invention.

It will also be appreciated that with the lid wall 124 in the closed state, the lid wall 124 effectively defines another side wall of the erected dispensing container 100, such that the second perforated section 180 is considered as being in a side wall thereof. Alternatively, the first and second perforated sections could be formed to extend across a folding score 110 such that the first perforated section 170 is rotated ninety degrees and shifted downwardly relative to how it is shown in FIG. 6, and the second perforated section is in one of the sidewalls 103 or 105, which side wall is to then be positioned so as to confront the drawer front 188. The first perforated section 170 advantageously defines a rectangle having a dimension of about 12 inches by 8 inches, and the second perforated section 180 advantageously defines a rectangle having a dimension of about 12 inches by 1½ inches, such that the junction 184 is about 12 inches long. Further advantageously, the outboard corners 190 of each of the perforated sections 170 and 180 are scored through to define radiused corners, rather than merely perforated, to facilitate clean removal of the perforated sections 170, 180 from their respective walls 104, 124.

After all of the gowns 12 have been dispensed from the dispensing container 100, the empty dispensing container 100 may be removed from the drawer 180 and collapsed for disposal. Advantageously, the locking tab 130 is removed, and the lid wall 124 manipulated back into the open state so as to allow the dispensing container 100 to be folded up into the collapsed state generally as shown in FIG. 7.

Figure 15:
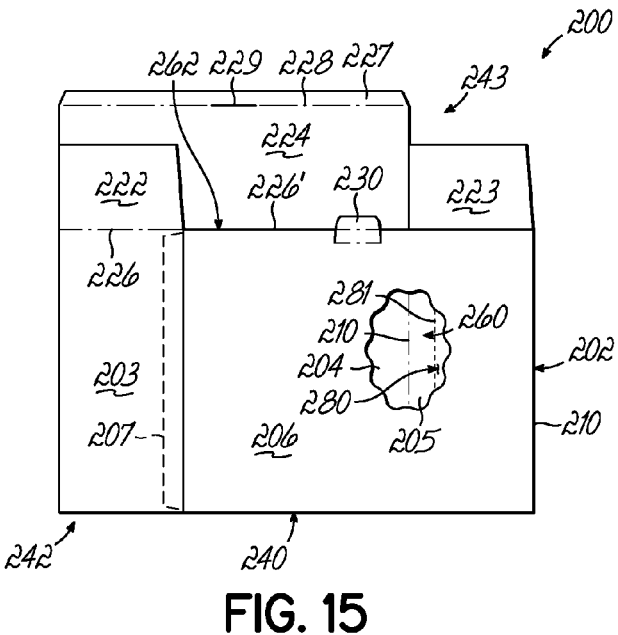
FIG. 15 is a partially broken away plan view of the assembled, collapsed, empty dispensing container of FIG. 14.
Figure 16:
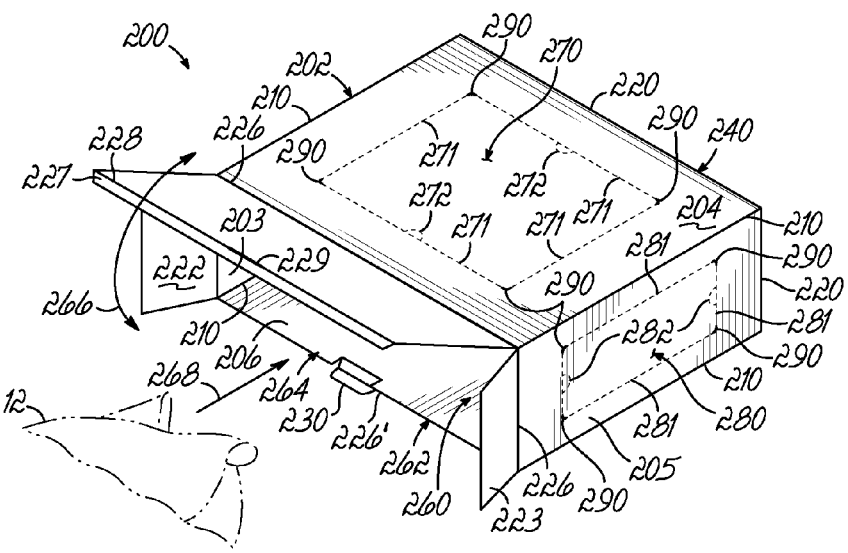
FIG. 16 is a perspective view of the un-collapsed or erected assembled dispensing container of FIG. 15 with the perforated sections intact and the closure in the open state ready for loading of clean, reusable medical gowns.
Figure 17A:
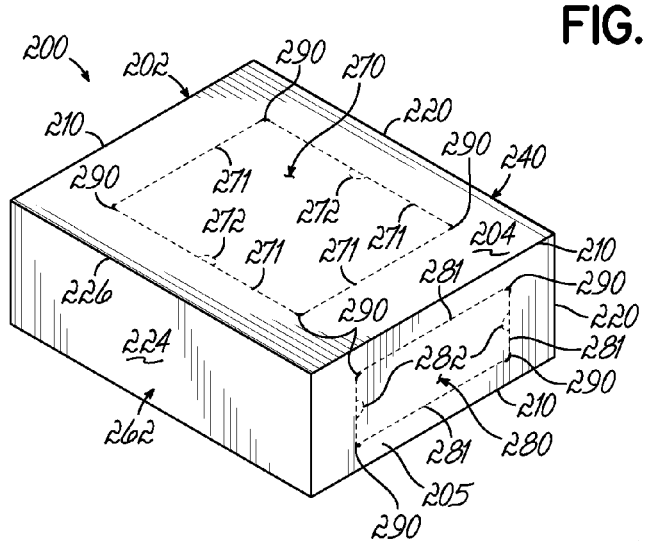
FIGS. 17A and 17B are perspective views of the un-collapsed or erected assembled dispensing container of FIG. 15 loaded with clean, reusable medical gowns, with the perforated sections intact and the closure in the closed state.
Figure 17B:
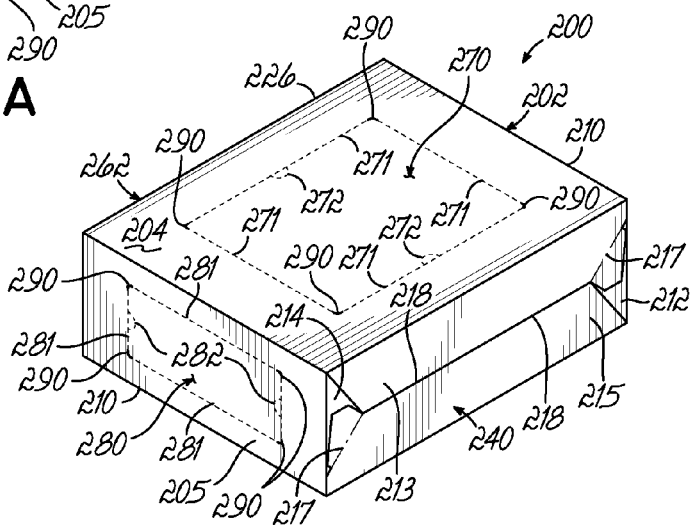

With reference to FIGS. 14 through 17B there is shown a third embodiment of a dispensing container 200 for loading with a plurality of clean, reusable medical gowns 12 (FIG. 17) in accordance with the principles of the present invention. For sake of clarity, only one gown 12 is shown in FIG. 17, but it will be appreciated that a plurality of such gowns 12 are typically involved. Dispensing container 200 is in the form of a paperboard box made from a blank 201 (FIG. 14) and is very much like dispensing container 100 except for its overall size, as well as the location and use of the first and second controllable access apertures 270 and 280 as will be described. To that end, the dispensing container 200 has a sidewall structure 202 comprised of four contiguous, generally solid, planar paperboard walls being in sequence, a first side wall 203, a main or top wall 204, a second side wall 205, and a second main or bottom wall 206. The walls 203, 204, and 205 are foldably interconnected as along respective folding scores 210. Interconnected to the bottom wall 206 is a further wall segment 207 along another folding score 210. The sidewall structure 202 also includes generally solid, planar paperboard flap segments 212, 213, 214, and 215 which are foldably interconnected to the respective walls 203, 204, 205, and 206 along a folding score 220. The flap segments 213 and 215 also include angled folding scores 217 and offset segments 218, which facilitate interleaving of the flap segments 212, 213, 214, and 215 in the same manner as did the flap segments 112, 113, 114, and 115 of the dispensing container 100. The sidewall structure 202 also includes generally solid, planar paperboard end flaps 222, 223 and a lid wall 224 foldably interconnected to the respective walls 203, 205, and 204 along a folding score 226. Lid wall 224 may have a tuck section 227 foldably interconnected thereto along a folding score 228, a portion of which may be cut through as at 229 to receive a locking tab 230 associated with the wall 206.

To form the dispensing container 200 from the blank 201, the walls 203, 204, 205, and 206 are folded into a generally rectangular shape such that main walls 204, 206 are spaced apart and the side walls 203, 205 are spaced apart and transverse to the main walls 204, 206. The wall segment 207 is adhered to the wall 203. The flap segments 212, 213, 214, and 215 are folded along the folding scores 220 and 217, and the flap segments 212 and 214 adhered to the flap segments 213 and 215 to butt up to the folding scores 217 so as to interleave them such that the offset segments 218 will interlock with the dispensing container 200 erected in the same manner as exemplified in FIGS. 8 through 10 for the dispensing container 100, so as to unfold and span to close off an end 240 of the dispensing container 200 defined across the folding score 220 (FIG. 17B). With the dispensing container 200 folded up or collapsed as shown in FIG. 15, the first side wall 203, associated end flap 222, bottom wall 206, and associated locking tab 130 define a flat, generally planar web 242, while the second side wall 205, associated end flap 223, top wall 204, and associated lid wall 224 and tuck section 229 define a flat, generally planar web 243, with the webs 242 and 243 being in parallel relationship so as to be generally confronting, and possibly contacting. The flap segments 212, 213, 214, and 215 are folded between the webs 242 and 243.

A dispensing container 200 may be obtained in the folded or collapsed state as seen in FIG. 15. As the dispensing container 200 is erected, the flap segments 212, 213, 214, and 215 will begin to unfold with the offset segments 218 aligned to receive opposing portions of the flap segments 213 and 215 to thus cause the flap segments 212, 213, 214, and 215 to become generally coplanar so as to present the effect of a transverse wall that spans and closes off the end 240 of the dispensing container 200 as seen in FIG. 17B. As unfolded or erected (FIG. 16), the dispensing container 200 defines an interior 260 between the end 240 and a first end 262 thereof opposite to the end 240 and defined along folding score 226 and the continuous edge 226' of the bottom wall 206. The first end 262 defines an opening 264 communicating with the interior 260 as seen in FIG. 17. The lid wall 224 defines a closure and is repeatedly manipulatable or foldable as indicated by arrow 266 (FIG. 16), such as by folding along folding score 226, between an open state as shown in FIG. 16 in which the opening 264 is exposed for loading of clean, reusable medical gowns 12 into the interior 260 as indicated by arrow 268, and a closed state as shown in FIG. 17A in which the lid wall 224 obstructs the opening 264, such as to help keep the loaded gowns 12 within the dispensing container 200.

With the lid wall 224 in the open state and the dispensing container 200 erected as shown in FIG. 16, a worker (not shown) may push the gowns 12, one by one or in groups, into the interior 260 through the opening 264. After filling the dispensing container 200 to the extent desired with clean, reusable medical gowns 12, the lid wall 224 may be manipulated into the closed state exemplified in FIG. 17A, by folding over the end flaps 222 and 223, and then folding over the lid wall 224 to span across the opening 264 and folding the tuck portion 229 in behind bottom wall 206. The locking tab 230, if provided, may be folded over and inserted into the cut through 229 to secure the lid wall 224 in the closed state.

The dispensing container 200 also includes at least a first controllable access aperture 270 communicating with the interior 260 and spaced from the first end 262 and the associated opening 264. The first controllable access aperture 270 is advantageously associated with the top wall 204 of the sidewall structure 202. In the embodiment of dispensing container 200 shown here, the first controllable access aperture 270 is defined by a perforation 271 spaced from the folding scores 210, 220, and 226 so as to be generally centrally located in the top wall 204 and define the first controllable access aperture 270 as a first, generally square or rectangular perforated section. The first perforated section 270 is normally intact with the top wall 204 so as to obstruct access to the interior 260 of the dispensing container 200 therethrough, but is removable, such as by tearing along the perforation 271, to permit access to the interior 260 therethrough whereby to dispense clean, reusable medical gowns 12 therefrom. Cutouts 272 may be provided along the perforation 271 by which to facilitate entry of a user's finger or thumb (not shown) in order to facilitate removal of the first perforated section 270.

Advantageously, dispensing container 200 includes a second controllable access aperture 280 associated with the side wall 205 (or, alternatively, the side wall 203 or the lid wall 224 which, in the closed state, may be seen as defining a further sidewall of the dispensing container 200). To that end, second controllable access aperture 280 is defined by a perforation 281 spaced from folding scores 210, 220, and 226 so as to be generally centrally located in the side wall 205 and define the second controllable access aperture 280 as a second, generally rectangular perforated section. The second perforated section 280 is normally intact with the side wall 205 so as to obstruct access to the interior 260 of the dispensing container 200 therethrough, but is removable, such as by tearing along the perforation 281, to permit access to the interior 260 therethrough whereby to dispense clean, reusable medical gowns 12 therefrom. Cutouts 282 may be provided along the perforation 281 by which to facilitate entry of a user's finger or thumb (not shown) in order to facilitate removal of the second perforated section 280.

Figure 18:
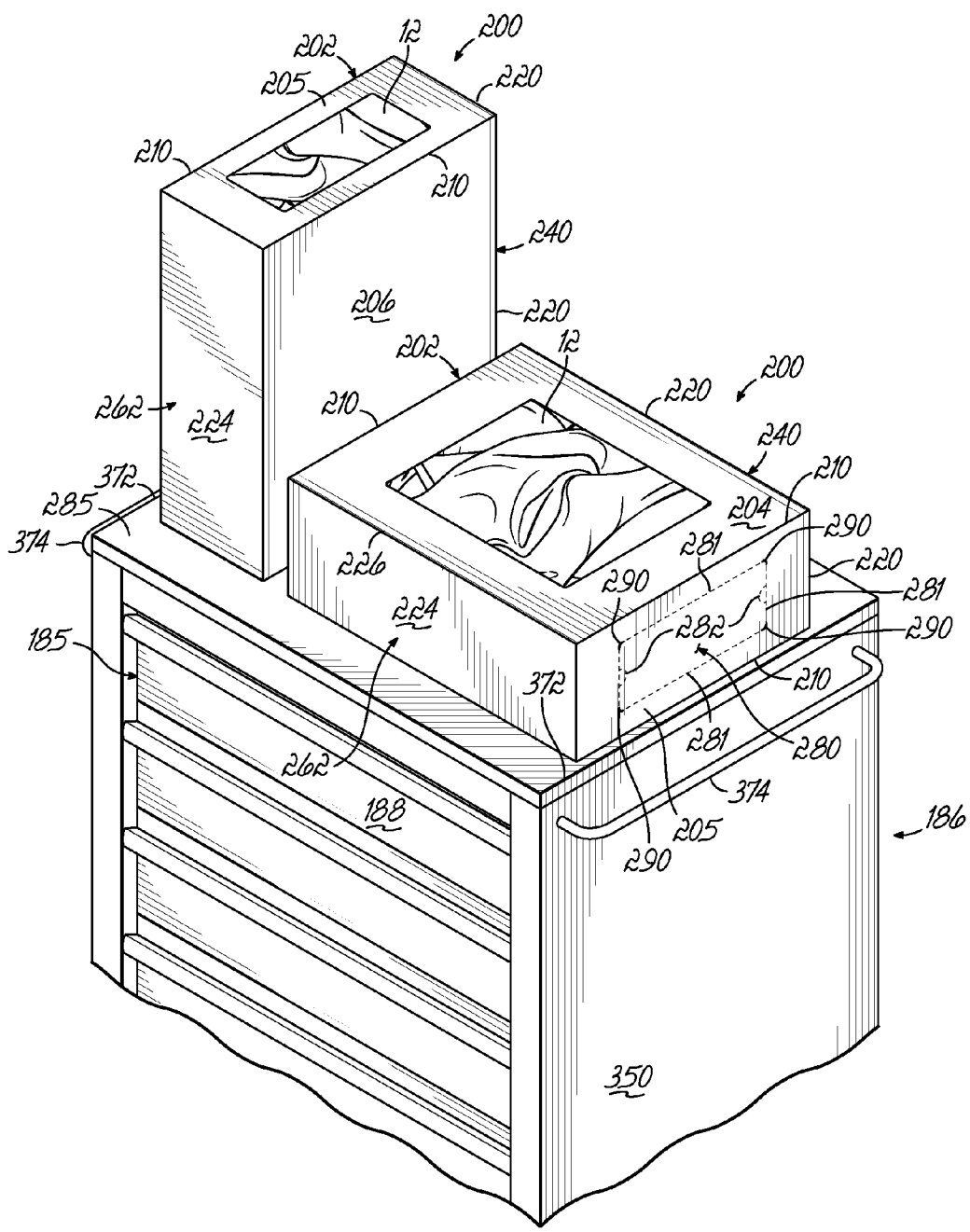
FIG. 18 is a perspective view of an isolation cart with two of the dispensing container of FIGS. 17A and 17B on a top surface thereof, one in a lying down orientation with the first perforated section removed and the other in a standing up orientation with the second perforated section removed for purposes of illustrating dispensing of clean, reusable medical gowns in accordance with the principles of the present invention.
Figure 19:
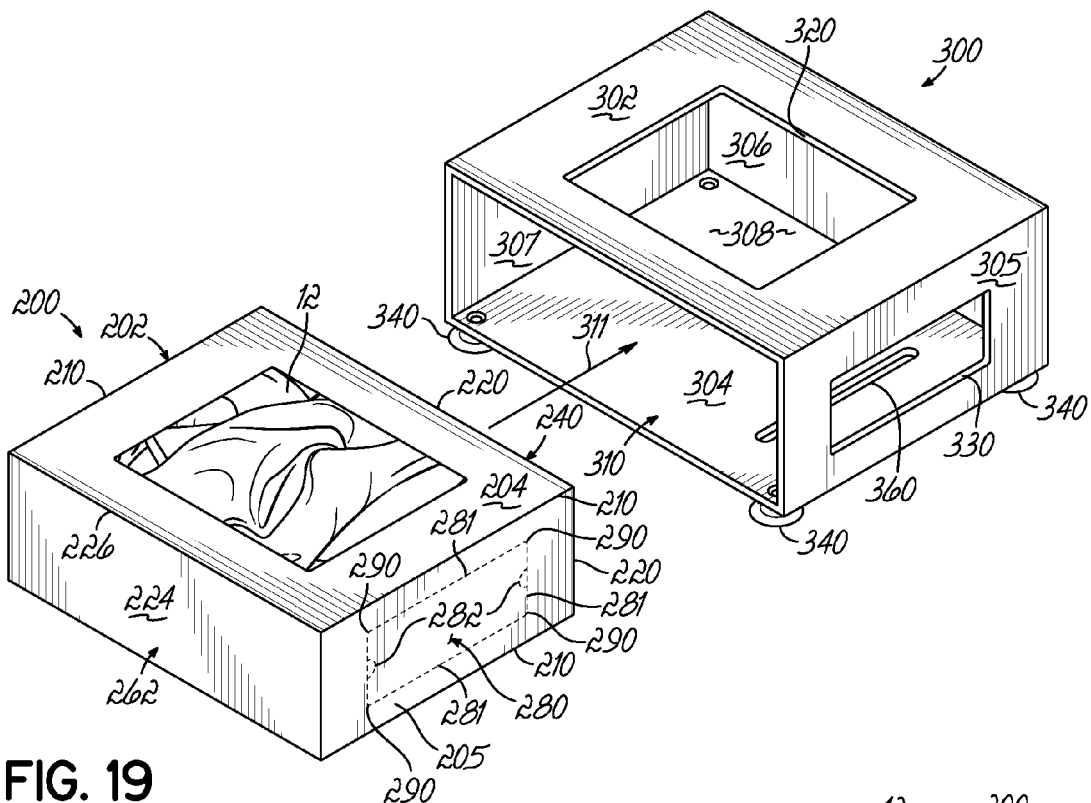
FIG. 19 is a perspective view of a supporting box for the dispensing container of FIGS. 17A and 17B and illustrating insertion of such a dispensing container into the supporting box with the first perforated section removed.
Figure 20:
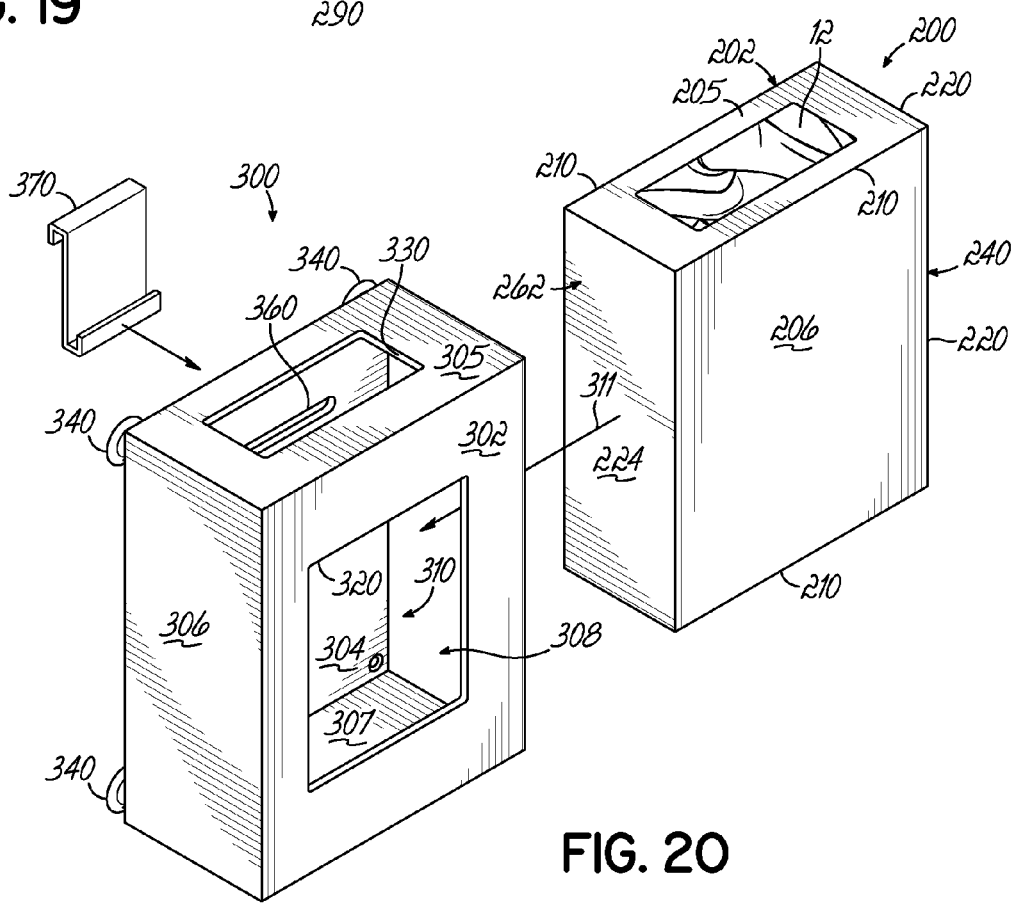
FIG. 20 is a perspective view of the supporting box of FIG. 19 and illustrating insertion of a dispensing container of FIGS. 17A and 17B into the supporting box with the second perforated section removed.

The first and second perforated sections 270 and 280 of the dispensing container 200 are thus spaced apart and separately removable to facilitate dispensing of clean, reusable medical gowns 12 from the paperboard box 200 at the point-of-use. To that end, and with reference to FIG. 18, the dispensing container 200 may be positioned in a lying down orientation with the top wall 204 facing upwardly and the bottom wall 206 facing downwardly such as resting on a top surface 285 of the isolation cart 186, and the first perforated section 270 removed to facilitate dispensing of a clean, reusable medical gown 12 therefrom by pulling one upwardly and out through the area vacated by removal of the first perforated section 270. Alternatively, the dispensing container 200 may be positioned in a standing up orientation with the side wall 205 facing upwardly and the side wall 203 facing downwardly and resting on the top surface 285 of the isolation cart 186, and the second perforated section 280 removed to facilitate dispensing of a clean, reusable medical gown 12 therefrom by pulling one upwardly and out through the area vacated by removal of the second perforated section 280. These two alternatives are shown to the right and to the left, respectively, in FIG. 18.

In the embodiment of the dispensing container 200 shown here, the side walls 203 and 205, as well as the lid wall 224 and when interleaved the flap segments 212, 213, 214, and 215, may be sized so as to define a height of about six inches. Similarly, the main walls 202, 204 may be sized to define approximately 16 inch by 12 inch rectangles. The first perforated section 270 advantageously defines a rectangle having a dimension of about 10 inches by 8 inches, and the second perforated section 280 advantageously defines a rectangle having a dimension of about 3½ inches by 8 inches. Further advantageously, the corners 290 of each of the perforated sections 270 and 280 are scored through to define radiused corners, rather than merely perforated, to facilitate clean removal of the perforated sections 270, 280 from their respective walls 204, 205.

A user (not shown) will remove one or the other of the first and second perforated sections 270 and 280 from a loaded dispensing container 200, and place the loaded dispensing container 200 onto a surface in the lying down or standing up orientation as desired for dispensing of the clean, reusable medical gowns 12 therefrom at the point-os-use. It will be appreciated, however, that during loading of the gowns 12 into the erected dispensing container 200 as discussed above in connection with FIG. 16, the perforated sections 270 and 280 are each advantageously kept intact. After all of the gowns 12 have been dispensed from the dispensing container 200, the empty dispensing container 200 may be collapsed for disposal. Advantageously, the locking tab 230 is removed, and the lid wall 224 manipulated back into the open state so as to allow the dispensing container 200 to be folded up into the collapsed state generally as shown in FIG. 16.

To facilitate use of the dispensing container 200 for dispensing the gowns 12, a supporting box 300 as shown in FIGS. 19-22 may be provided. In that regard, the supporting box 300 has spaced apart, generally planar rigid main walls 302, 304. The rigid main walls 302, 304 are interconnected by a pair of generally planar rigid side walls 305 and 307, and a third generally planar rigid side wall 306 extending therebetween. The third rigid side wall 306 is advantageously connected to the pair of rigid side walls 305, 307 such that the three rigid side walls 305, 306, and 307 are advantageously contiguous. The main walls 302, 304, and the side walls 305, 306, and 307 cooperate to define a container receiving space 308 therebetween. The container receiving space 308 has a spacing between the main walls 302, 304 about equal to the height of the side walls 203, 205 of the dispensing container 200, and a spacing between side walls 305 and 307 equal to the long dimension of the main walls 204 or 206 of the dispensing container 200. The supporting box 300 has an open side at 310 sized to receive a dispensing container 200 therethrough such as along arrows 311. Advantageously, the dispensing container 200 is inserted with the transverse wall created by the interleaved, unfolded flap segments 212, 213, 214, and 215 facing the rigid sidewall 206 until confronting thereagainst, such that the lid wall 224 is at the opening 310 of the supporting box. The main or top wall 204 and the side walls 205, 203 of the dispensing container 200 are confronting against the main rigid wall 302 and the rigid side walls 305, 307, respectively, of the supporting box 300. The rigid main wall 302 includes an aperture 320 into the container receiving space 308 and sized and positioned centrally in the rigid main wall 302 to match up with the first perforated section 270 in the main wall 204 of the dispensing container 200. Similarly, the rigid side wall 305 includes an aperture 330 into the container receiving space 308 and sized and positioned centrally in the rigid side wall 305 to match up with the second perforated section 280 in the side wall 205 of the dispensing container 200.

Figure 21:
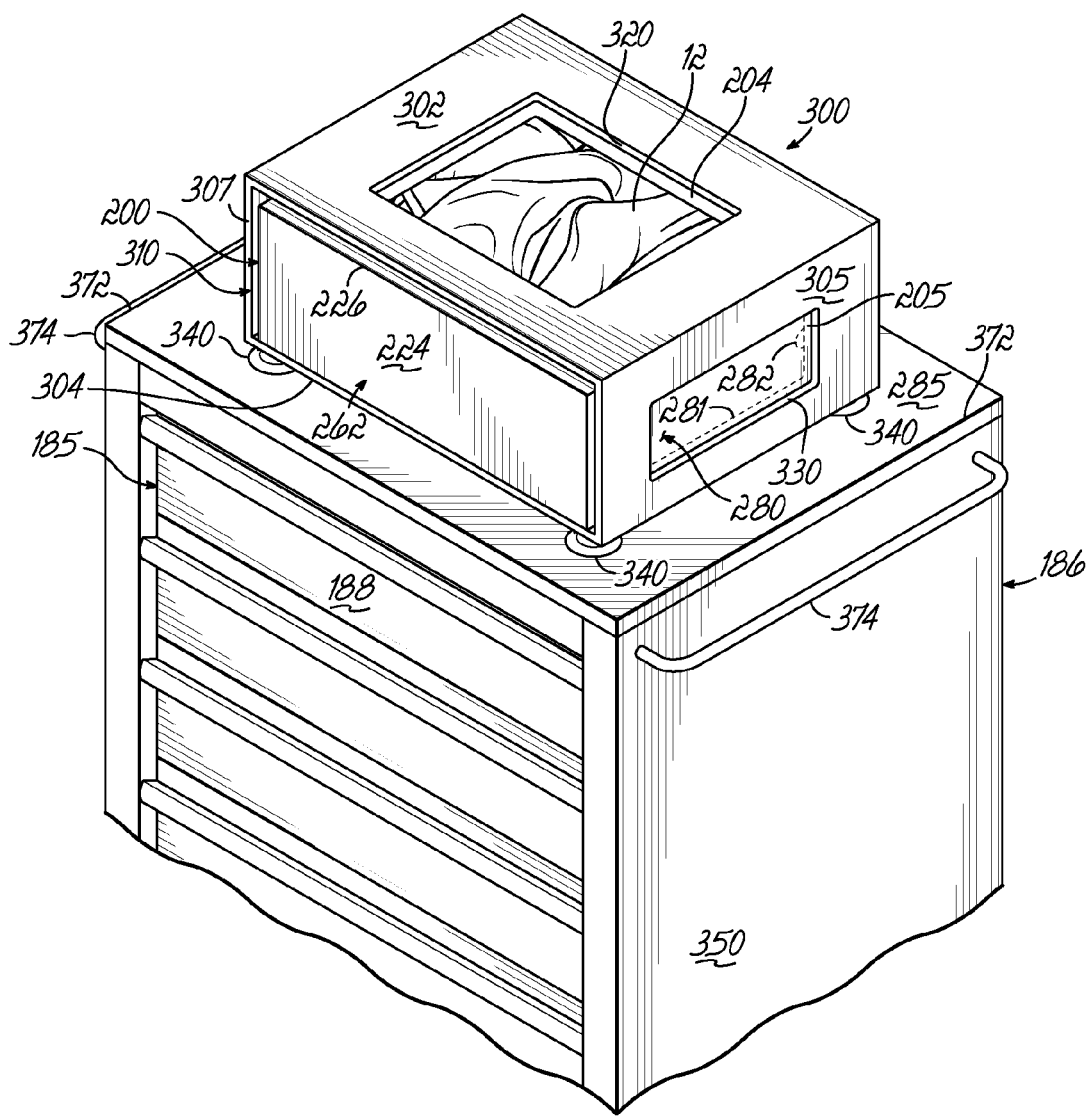
FIG. 21 is a perspective view of an isolation cart with the supporting box of FIG. 19 on a top surface thereof supporting a dispensing container of FIGS. 17A and 17B in the lying down orientation and with the first perforated section removed for purposes of illustrating dispensing of clean, reusable medical gowns in accordance with the principles of the present invention.

To dispense clean, reusable medical gowns 12 from the dispensing container 200 in the lying down orientation, the supporting box 300 is positioned such that the rigid main wall 302 thereof is directed upwardly and the rigid main wall 304 is directed downwardly. With the first perforated section 270 of the dispensing container 200 removed, either before or after insertion into the supporting box 300, supporting box 300 is positioned with the rigid main wall 304 confronting a horizontal surface, such as the top surface 285 of the isolation cart 186 as seen in FIG. 21 so as to aim the aperture 320 upwardly. A clean, reusable medical gown 12 may be dispensed therefromat the point-os-use by pulling a gown 12 upwardly and out through the aperture 320 and the area vacated by removal of the first perforated section 270.

The other main wall 304 of the supporting box 300 includes a plurality of outwardly projecting resilient members 340 (such as adjacent each corner thereof) which may provide a cushion for the supporting box 300 when set on the top surface 285 to dispense gowns 12 in the lying down orientation. Advantageously, the resilient members 340 are suction cups so as to hold the supporting box 300 in place on the top surface 285.

Figure 22:
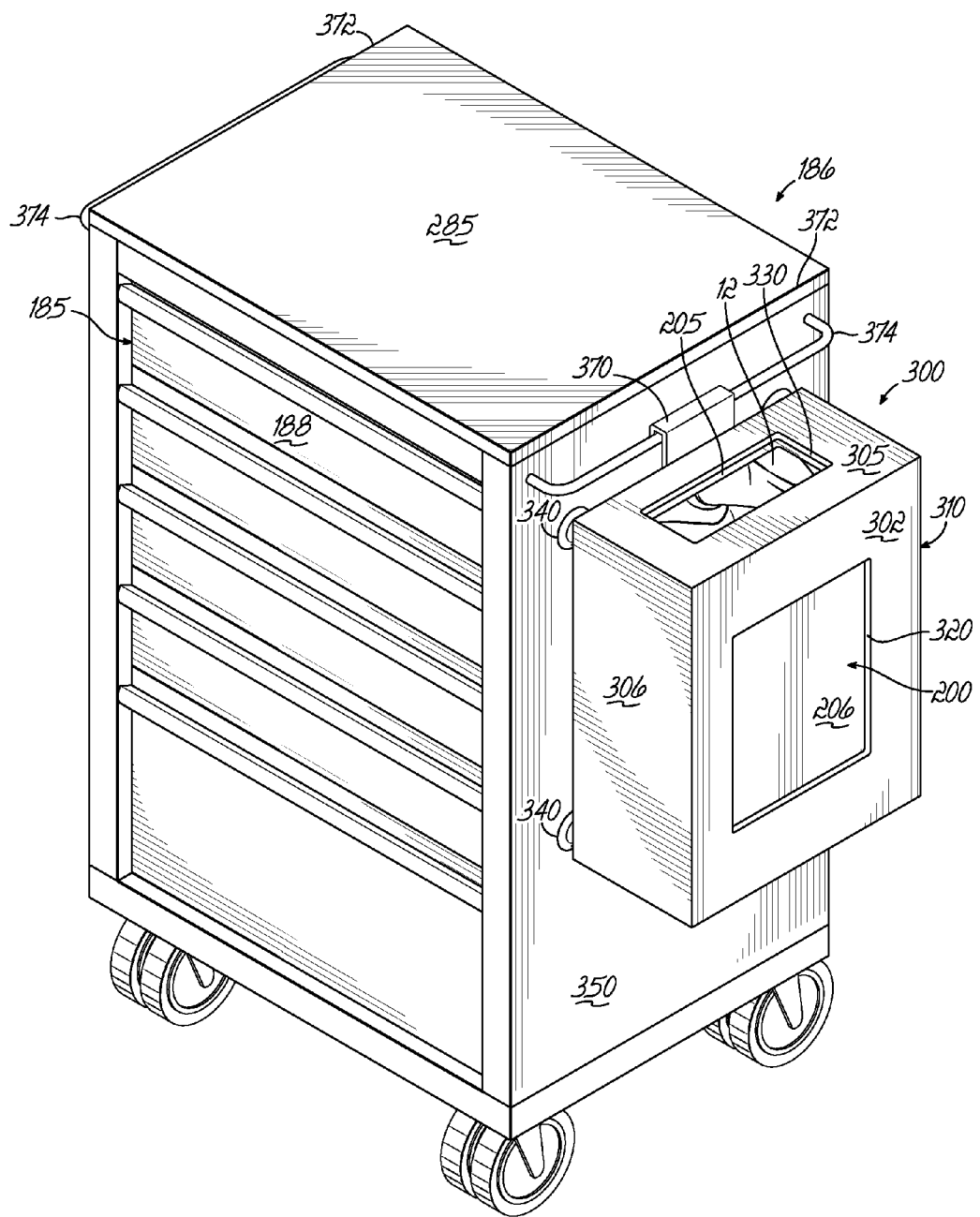
FIG. 22 is a perspective view of an isolation cart with the supporting box of FIG. 19 on the side thereof supporting a dispensing container of FIGS. 17A and 17B in the standing up orientation and with the second perforated section removed for purposes of illustrating dispensing of clean, reusable medical gowns in accordance with the principles of the present invention.

Alternatively, to dispense clean, reusable medical gowns 12 form the dispensing container 200 in the standing up orientation, the supporting box 300 is positioned such that the rigid side wall 305 is directed upwardly and the rigid side wall 307 is directed downwardly. With the second perforated section 280 of the dispensing container 200 removed, either before or after insertion into the supporting box 300, supporting box 300 is positioned with the rigid main wall 307 confronting a horizontal surface, such as the top surface 285 of the isolation cart 186 so as to aim the aperture 330 upwardly. Advantageously, the supporting box 300 may be suspended vertically, such as along the side 350 of the isolation cart 286 with the aperture 330 aiming upwardly. To that end, the rigid main wall 304 also includes a slot 360 adapted to receive a hangar hook 370 by which to suspense the supporting box 300 along the cart side 350, such as from an edge 372 thereof or a side handle 374 thereof, the latter as shown in FIG. 22. A clean, reusable medical gown 12 may be dispensed therefrom at the point-os-use by pulling a gown 12 upwardly and out through the aperture 330 and the area vacated by removal of the second perforated section 280.

When the dispensing container 200 is empty, it may be removed and collapsed and disposed of as previously described, and a new dispensing container 200 loaded with clean, reusable medical gowns 12 inserted into the supporting box 300 for use.

Figure 25:
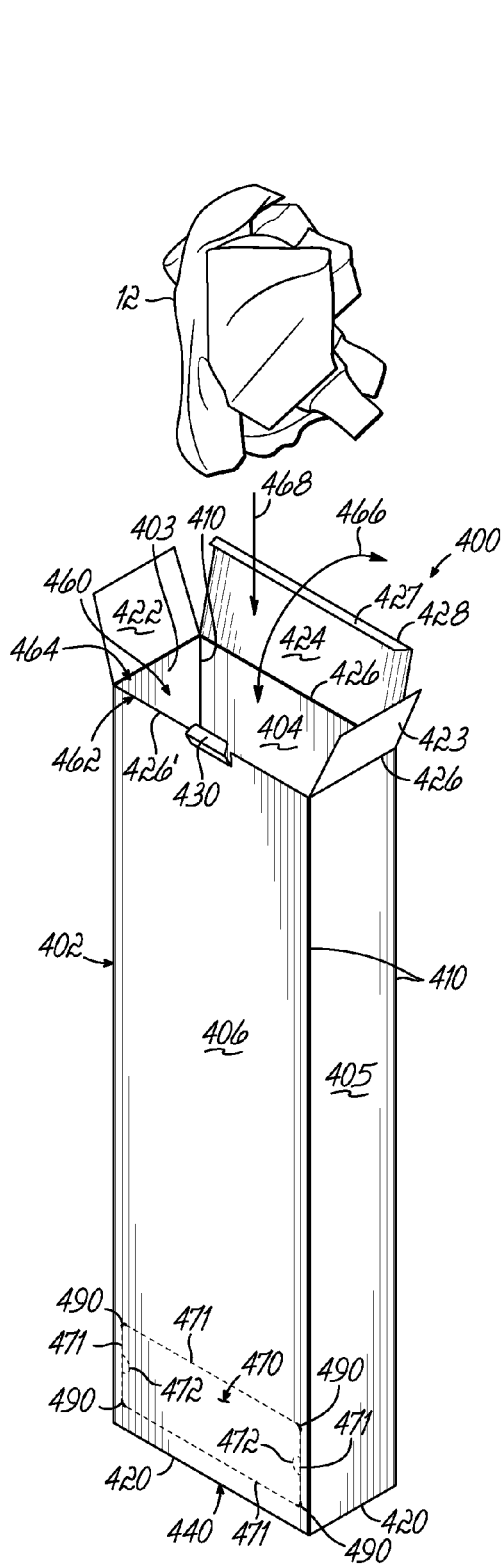
FIG. 25 is a perspective view of the un-collapsed or erected assembled dispensing container of FIG. 24 with the perforated section intact and the closure in the open state ready for loading of clean, reusable medical gowns.

With reference to FIGS. 23 through 26 there is shown a fourth embodiment of a dispensing container 400 for loading with a plurality of clean, reusable medical gowns 12 (FIG. 25) in accordance with the principles of the present invention. For sake of clarity, only one gown 12 is shown in FIG. 25, but it will be appreciated that a plurality of such gowns 12 are typically involved. Dispensing container 400 is in the form of a paperboard box made from a blank 401 (FIG. 23) and is very much like dispensing containers 100 and 200 except for its overall size, as well as the location and use of the first controllable access aperture 470 (this embodiment does not necessarily have a second controllable access aperture) as will be described. To that end, the dispensing container 400 has a sidewall structure 402 comprised of four contiguous, generally solid, planar paperboard walls being in sequence, a first side wall 403, a main or bottom wall 404, a second side wall 405, and a second main or top wall 406. The walls 403, 404, and 405 are foldably interconnected as along respective folding scores 410. Interconnected to the top wall 406 is a further wall segment 407 along another folding score 410. The sidewall structure 402 also includes generally solid, planar paperboard flap segments 412, 413, 414, and 415 which are foldably interconnected to the respective walls 403, 404, 405, and 406 along a folding score 420. The flap segments 413 and 415 also include angled folding scores 417 and offset segments 418, which facilitate interleaving of the flap segments 412, 413, 414, and 415 in the same manner as did the flap segments 112, 113, 114, and 115 of the dispensing container 100. The sidewall structure 402 also includes generally solid, planar paperboard end flaps 422, 423 and a lid wall 424 foldably interconnected to the respective walls 403, 405, and 404 along a folding score 426. Lid wall 424 may have a tuck section 427 foldably interconnected thereto along a folding score 428, a portion of which may be cut through as at 429 to receive a locking tab 430 associated with the wall 406.

Figure 26A:
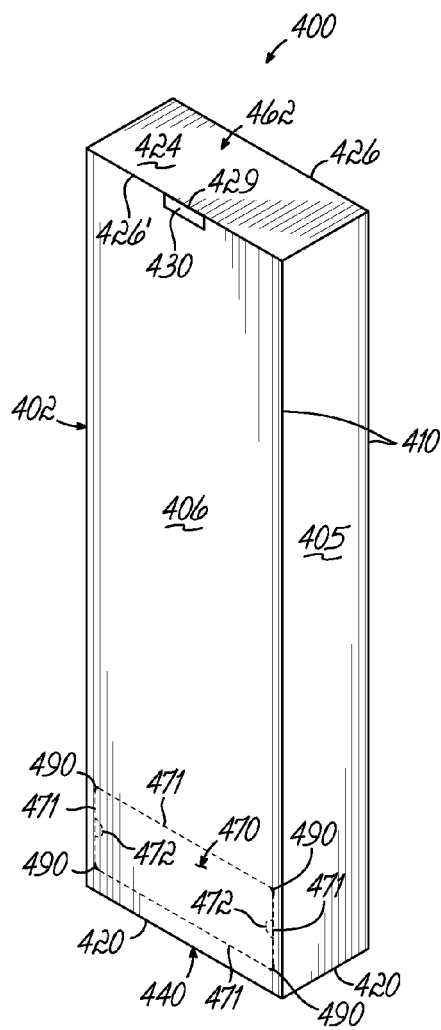
FIG. 26A is a perspective view.
Figure 26B:
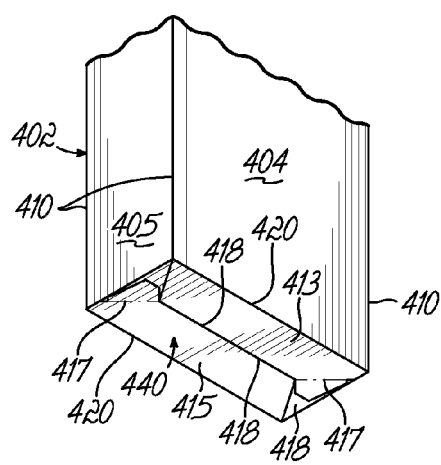
FIG. 26B is a partial, perspective view, of the un-collapsed or erected assembled dispensing container of FIG. 24 loaded with clean, reusable medical gowns, the closure in the closed state, and the first perforated section intact in accordance with the principles of the present invention.

To form the dispensing container 400 from the blank 401, the walls 403, 404, 405, and 406 are folded into a generally rectangular shape such that main walls 404, 406 are spaced apart and the side walls 403, 405 are spaced apart and transverse to the main walls 404, 406. The wall segment 407 is adhered to the wall 403. The flap segments 412, 413, 414, and 415 are folded along the folding scores 420 and 417, and the flap segments 412 and 414 adhered to the flap segments 413 and 415 to butt up to the folding scores 417 so as to interleave them such that the offset segments 418 will interlock with the dispensing container 400 erected in the same manner as exemplified in FIGS. 8 through 10 for the dispensing container 100, so as to unfold and span to close off an end 440 of the dispensing container 400 defined across the folding score 420 as seen in FIG. 26B. With the dispensing container 400 folded up or collapsed as shown in FIG. 24, the first side wall 403, associated end flap 422, top wall 406, and associated locking tab 430 define a flat, generally planar web 442, while the second side wall 405, associated end flap 423, bottom wall 404, and associated lid wall 424 and tuck section 429 define a flat, generally planar web 443, with the webs 442 and 443 being in parallel relationship so as to be generally confronting, and possibly contacting. The flap segments 412, 413, 414, and 415 are folded between the webs 442 and 443.

A dispensing container 400 may be obtained in the folded or collapsed state as shown in FIG. 24. As the dispensing container 400 is erected, the flap segments 412, 413, 414, and 415 will begin to unfold with the offset segments 418 aligned to receive opposing portions of the flap segments 413 and 415 to thus cause the flap segments 412, 413, 414, and 415 to become generally coplanar so as to present the effect of a transverse wall that spans and closes off the end 440 of the dispensing container 400 as seen in FIG. 26B. As unfolded or erected (FIG. 25), the dispensing container 400 defines an interior 460 between the end 440 and a first end 462 thereof opposite to the end 440 and defined along folding score 426 and the continuous edge 426' of the top wall 406. The end 462 defines an opening 464 communicating with the interior 460 as seen in FIG. 25. The lid wall 424 defines a closure and is repeatedly manipulatable or foldable as indicated by arrow 466 (FIG. 25), such as by folding along folding score 426, between an open state as shown in FIG. 25 in which the opening 464 is exposed for loading of clean, reusable medical gowns 12 into the interior 460 as indicated by arrow 468, and a closed state as shown in FIG. 26A in which the lid wall 424 obstructs the opening 464, such as to help keep the loaded gowns 12 within the dispensing container 400.

With the lid wall 424 in the open state and the dispensing container 400 erected as shown in FIG. 25, a worker (not shown) may push the gowns 12, one by one or in groups, into the interior 460 through the opening 464. After filling the dispensing container 400 to the extent desired with clean, reusable medical gowns 12, the lid wall 424 may be manipulated into the closed state exemplified in FIG. 26A, by folding over the end flaps 422 and 423, and then folding over the lid wall 424 to span across the opening 464 and folding the tuck portion 429 in behind top wall 406. The locking tab 430, if provided, may be folded over and inserted into the cut through 429 to secure the lid wall 424 in the closed state.

The dispensing container 400 also includes at least a first controllable access aperture 470 communicating with the interior 460 and spaced from the first end 462 and the associated opening 464. To that end, the first controllable access aperture 280 is advantageously associated with the top wall 406 adjacent the end 440 and spanning between the side walls 403 and 405 thereat so as to extend along a lower aspect of the dispensing container 400 when the dispensing container is held with the end 440 facing downwardly, which also advantageously positions the lid wall 424 to face upwardly.

In the embodiment of dispensing container 400 shown here, the first controllable access aperture 470 is defined by a perforation 471 spaced near the folding scores 410, 420, and well away from the edge 426' so as to define the first controllable access aperture 470 as a first, generally square or rectangular perforated section adjacent the end 440. The first perforated section 470 is normally intact with the top wall 406 so as to obstruct access to the interior 460 of the dispensing container 400 therethrough, but is removable, such as by tearing along the perforation 471, to permit access to the interior 460 therethrough whereby to dispense clean, reusable medical gowns 12 therefrom. One or more cutouts 472 may be provided along the perforation 471 by which to facilitate entry of a user's finger or thumb (not shown) in order to facilitate removal of the first perforated section 470.

With reference to FIG. 26, the loaded dispensing container 400 is advantageously positioned with the lid wall 424 facing upwardly so as to position the first perforated section 470 near what will look like the bottom of the dispensing container 400 such that, after removal of the first perforated section 470, clean, reusable medical gowns 12 may be dispensed therefrom by pulling one outwardly through the area vacated by removal of the first perforated section 470.

In the embodiment of the dispensing container 400 shown here, the side walls 403 and 405, as well as the lid wall 424 and when interleaved the flap segments 412, 413, 414, and 415, may be sized so as to define a height of about 5½ inches. Similarly, the main walls 404, 406 may be sized to define approximately 30 inch by 10 inch rectangles. The first perforated section 470 advantageously defines a rectangle having a dimension of about 8½ inches by 3½ inches, although the first perforated section 470 may be as tall as up to about 8 inches if desired. Further advantageously, the corners 490 of the perforated section 470 are scored through to define radiused corners, rather than merely perforated, to facilitate clean removal of the perforated section 470 from the main wall 406. It will be appreciated, however, that during loading of the gowns 12 into the erected dispensing container 400 as discussed above in connection with FIG. 25, the perforated section 470 is advantageously kept intact.

After all of the gowns 12 have been dispensed from the dispensing container 400, the empty dispensing container 400 may be collapsed for disposal. Advantageously, the locking tab 430 is removed, and the lid wall 424 manipulated back into the open state so as to allow the dispensing container 400 to be folded up into the collapsed state generally as shown in FIG. 24.

To facilitate use of the dispensing container 400 for dispensing the gowns 12, a supporting box 500 as shown in FIGS. 27-30 may be provided. In that regard, the supporting box 500 has a generally planar, rigid back wall 502 and four, generally planar rigid side walls 504, 505, 506, and 507 defining a rectangle extending therefrom. The rigid side walls 504, 505, 506, and 507 are advantageously connected so as to be contiguous. The rigid back wall 502 and the rigid side walls 504, 505, 506, and 507 cooperate to define a container receiving space 510 therebetween. The side walls 504, 505, 506, and 507 each have a depth about the same or slightly larger than the height of the side walls 403, 405 of the dispensing container 400, with a spacing between side walls 505 and 507 about equal to or slightly larger than the long dimension of the main walls 404 or 406 of the dispensing container 400 and a spacing between side walls 504 and 506 about equal to or slightly larger than the short dimension of the main walls 404 or 406 of the dispensing container 400 so as to hold a dispensing container 400 closely therein. Mounted to the side wall 504 such as by hinges 512 is a door 515 through which to selectively gain access to the container receiving space 510.

Figure 30:
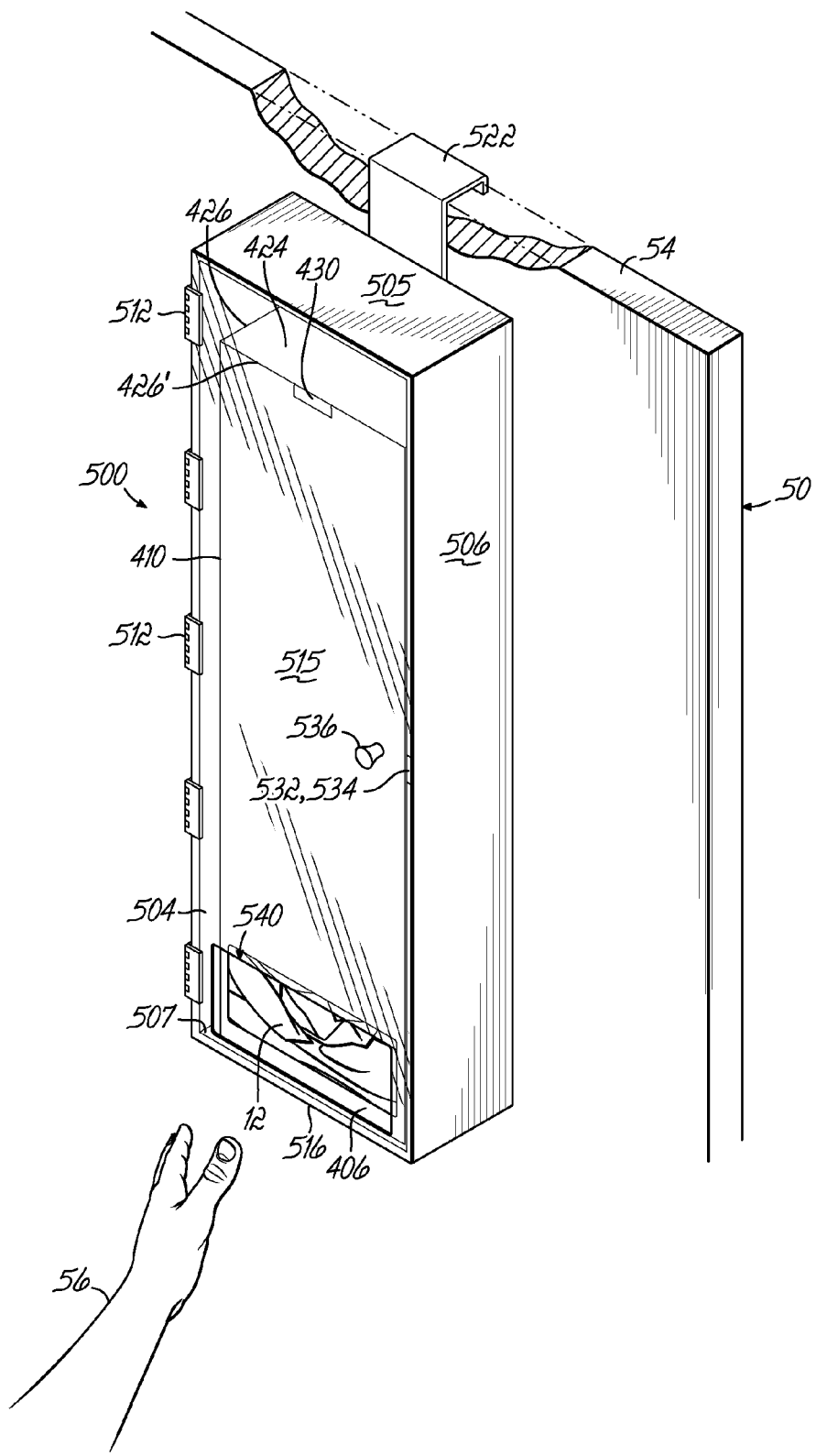
FIG. 30 is a perspective view of the supporting box and dispensing container as shown in FIG. 27 suspending from a building door for purposes of illustrating dispensing of a clean, reusable medical gown in accordance with the principles of the present invention.

The supporting box 500 is adapted to be suspended vertically with the rigid wall 507 directed downwardly such that edge 516 of the door 515 defines the lower edge of the door 515. To that end, the rigid back wall 502 of the supporting box 500 includes a slot 520 adapted to receive a hangar hook 522 (FIG. 29) by which to suspend the supporting box 500 vertically, such as from the building door 50, with the hangar hook 522 mounted over the top 54 of the door 50 as seen in FIG. 30 such that the rigid wall 507 is directed downwardly. Two slots 520 are shown and provide the ability to adjust the elevation of the supporting box 500 on the building door 50. The rigid back wall 502 may also include an outwardly projecting resilient member 530 (FIG. 29) which may provide a cushion for the supporting box 500 against the door 50. The resilient member 530 is advantageously a suction cup so as to hold the supporting box 500 in place against the building door 50.

Figure 27:
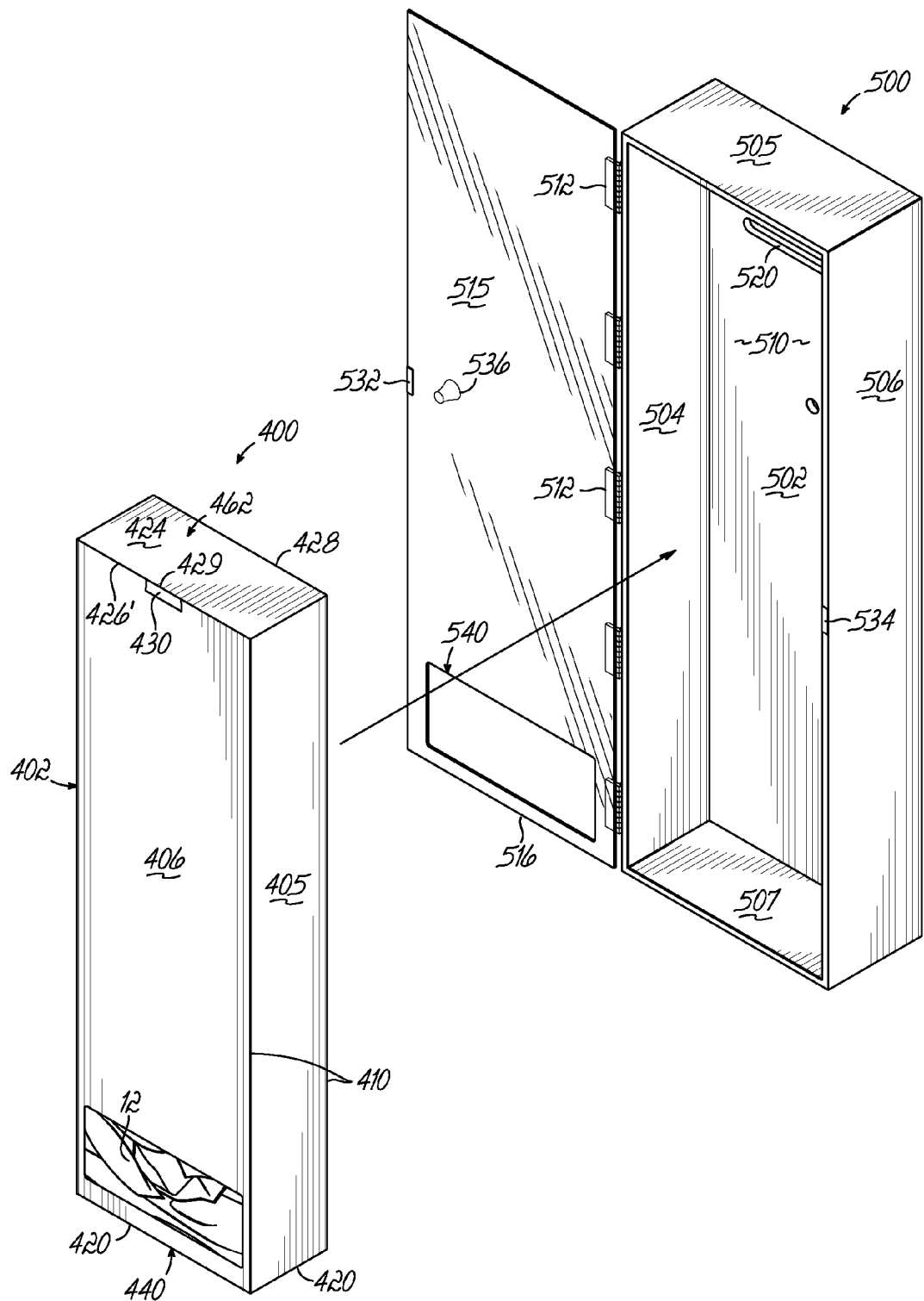
FIG. 27 is a perspective view of a supporting box for the dispensing container of FIGS. 26A and 26B, illustrating insertion of such a dispensing container into the supporting box with the first perforated section removed.
Figure 28:
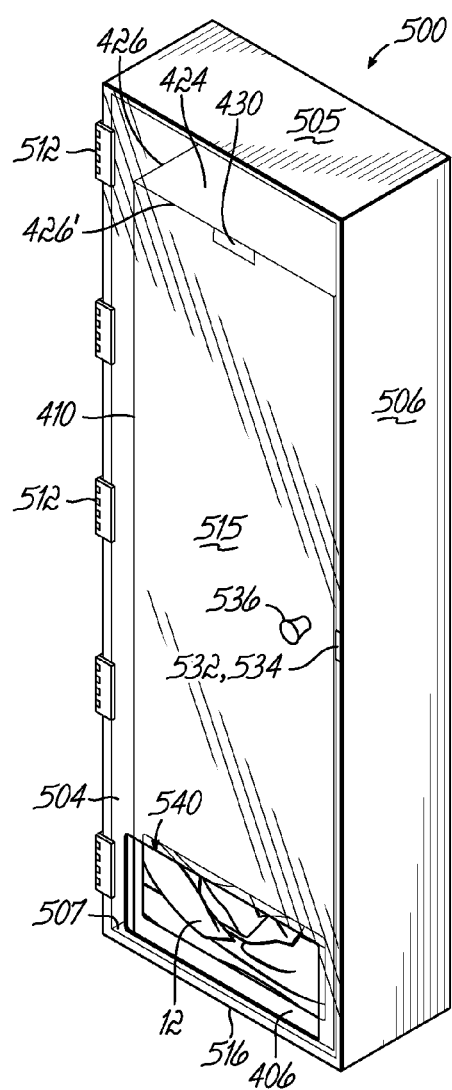
FIG. 28 is a perspective view of the supporting box of FIG. 27 supporting a dispensing container of FIGS. 26A and 26B with the first perforated section removed for purposes of illustrating dispensing of clean, reusable medical gowns in accordance with the principles of the present invention.
Figure 29:
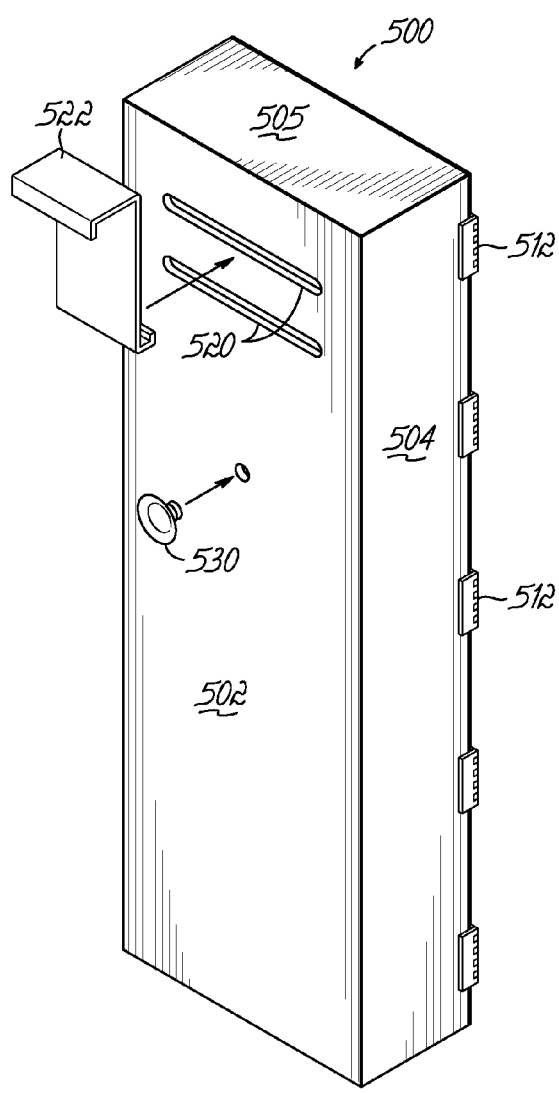
FIG. 29 is a rear, exploded perspective view of supporting box of FIG. 27.

Door 515 is typically held closed such as by a cooperating magnetic closures in the form of a magnetic plate 532 and a magnetic holder 534 on the door 515 and the rigid sidewall 506, respectively, and may be pulled open by pulling on the handle 536. By opening the door 515 of the supporting box 500 as seen in FIG. 27, a loaded dispensing container 400 may be placed into the container receiving space 510 with the back wall 404 thereof confronting against the rigid back wall 502 and with the first perforated section 470 positioned near the rigid wall 507 so that the first perforated section 470 is near the bottom or lower aspect of the supporting box 500. An aperture 540 is defined along the lower edge 516 of the door 515. The aperture 540 is sized and positioned such that with the loaded dispensing container 400 properly positioned in the container receiving space 510 and the door 515 closed, the aperture 540 mates with the first perforated section 470 as seen in FIG. 28. While the aperture 540 is shown as being integral with the door 515, a comparable aperture (not shown) could be created by defining a gap between the lower edge 516 and the rigid side wall 507, such as by shortening the length of the door 515 accordingly.

A clean, reusable medical gown 12 may be dispensed at the point-of-use from the supporting box 500 with the door 515 closed by pulling a gown 12 outwardly through the aperture 540 and the area vacated by removal of the first perforated section 470. To that end, the hangar hook 522 is fitted to a selected slot 520 such that when the supporting box 500 is suspended to the building door 50 as seen in FIG. 30, the aperture 540 is situated at about the level of a medical practitioner's hand 56 so as to facilitate easy dispensing of the gowns 12 therefrom. When the dispensing container 400 is empty, it may be removed from the supporting box 500 by opening the door 515 and pulling out the empty dispensing container 400. Another dispensing container 400 loaded with clean, reusable medical gowns 12 may be placed into the supporting box, the first perforated section 470 thereof removed, and the door 515 closed to allow dispensing of the clean gowns 12 therefrom as above-described. The empty dispensing container 12 may be collapsed and disposed of also as above-described.

With dispensing containers according to the present invention, such as the exemplary embodiments 10, 100, 200, and 400 described herein, clean, reusable medical gowns 12 by be loaded into the dispensing container and transported to or around a healthcare facility (not shown) and placed where needed for ready access to clean, reusable medical gowns 12, without the need to be manually handled in loose groups once in the dispensing container. To that end, and in accordance with other principles of the present invention, a dispensing container 10, 100, 200, or 400 is obtained and a plurality of clean, reusable medical gowns 12 are obtained, and the gowns 12 are loaded into the dispensing container through the opening with the closure in an open state. The closure is then manipulated into the closed state for delivery or transport to or around the healthcare facility. The loaded dispensing container is then used to selectively dispense clean, reusable medical gowns at the point-of-use through one or more controllable access apertures thereof as described herein.

Figure 31:
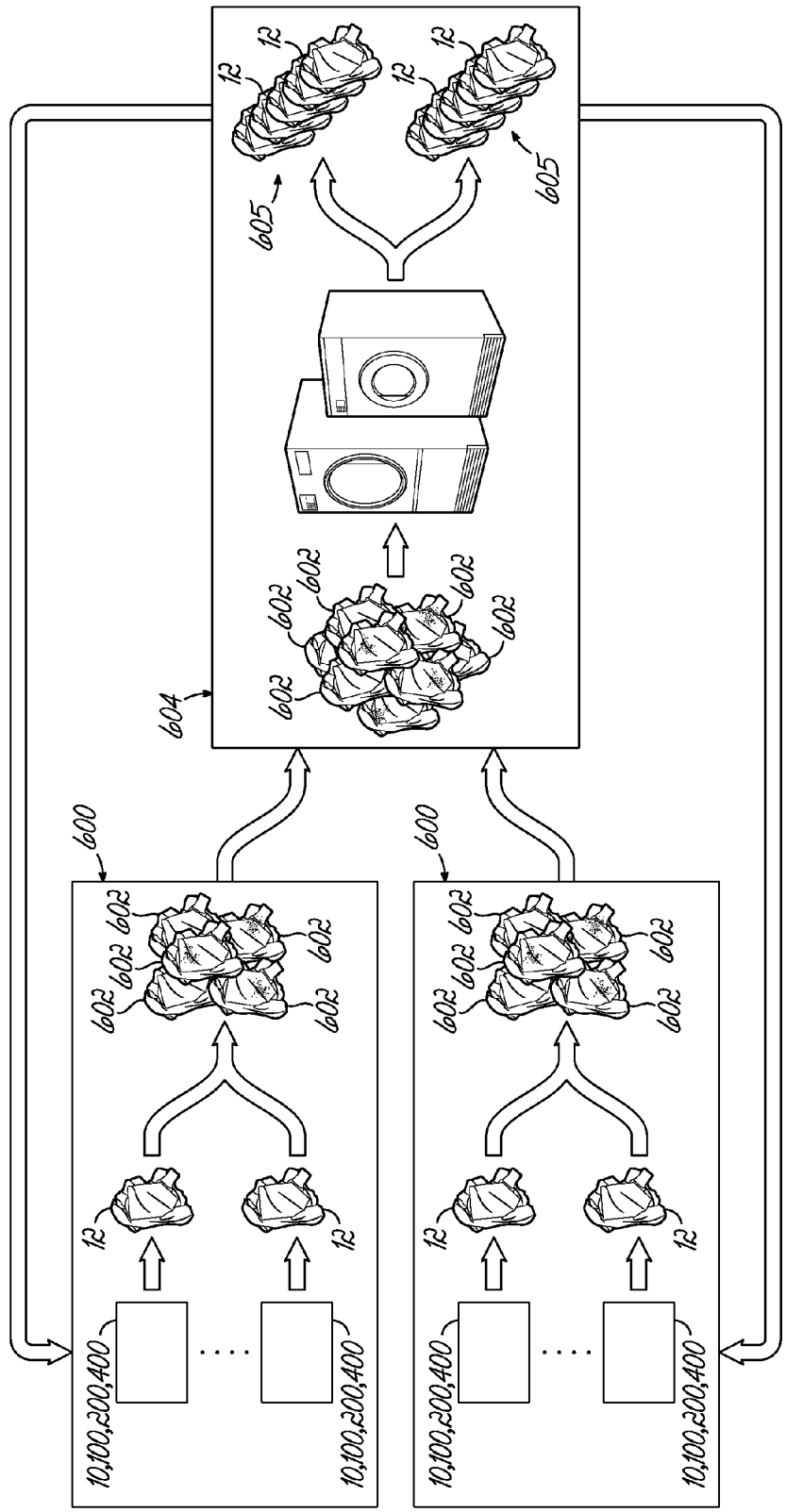
FIG. 31 is diagram illustrating a method of distribution and dispensing of clean, reusable medical gowns 12 in accordance with the principles of another aspect of the present invention.

In accordance with another aspect of the present invention, and with reference to FIG. 31, clean, reusable medical gowns 12 are dispensed from one or more dispensing containers 10, 100, 200, and/or 400 at one or more healthcare facilities 600 (while only two are shown, it will be appreciated that there could be many more). After each such gown 12 is used, it is considered a soiled gown 602 and is to be laundered, such as in a laundry facility 604 to again be a clean, reusable medical gown 12 and distributed for reuse. Where multiple healthcare facilities 600 are involved, all of the soiled gowns 602, possibly along with other textile items (not shown), are delivered to the laundry facility 604 where they are sorted, laundered, and then separated into groups 605 of clean, reusable medical gowns 12 for delivery to the respective healthcare facilities 600. One or more dispensing containers 10, 100, 200, and/or 400 may be obtained at the laundry facility 604 and loaded with various pluralities of clean, reusable medical gowns 12 from the respective groups 605. The loaded dispensing container(s) may then be delivered to the respective healthcare facilities 600 ready for distribution therein to dispense the clean gowns 12 at the various points-of-use. Alternatively, or additionally, some groups 605 of clean gowns 12, or portions thereof, may be delivered in bulk to one or more of the healthcare facilities 600, and the respective facility 600 may obtain the dispensing container(s) and load the clean gowns therein for subsequent distribution throughout the healthcare facility 600. Although shown as separate from the healthcare facilities 600, in some cases, a healthcare facility 600 may have its own laundry capability, such the laundry facility 604 is considered part of the healthcare facility 600 and may attend to soiled textiles for only that healthcare facility 600. In any event, as a result, the clean, reusable medical gowns 12 do not need to be manually handled in loose groups for dispensing at the point-of-use, and may also not need to be manually handled in loose groups for distribution. Instead, a group of clean, reusable medical gowns 12 are loaded into and held together in the dispensing container 10, 100, 200, or 400 which is then easily distributed to and/or around the healthcare facility 600.

By virtue of the foregoing, the drawbacks previously associated with reusable medical gowns are overcome such that, in the view of the healthcare facility, they are as convenient and easy to handle, store, distribute, and use as disposable medical gowns. The healthcare facility will thus be encouraged to provide reusable medical gowns preferred by medical practitioners while enjoying the long term cost savings and other advantages provided thereby.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, while the dispensing containers 100, 200, and 400 are said to be comprised of paperboard, it will be appreciated that paperboard includes not only cardboard-like material, but also generally planar, and somewhat flexible or resilient webs of other material, such as corrugated board, coated paper or stock, and synthetic webs, all as readily recognized in the carton art. Also, the rigid walls of the supporting boxes 300 and 500 are advantageously formed of wood sheet or compressed material or the like, but may also be made of other relatively stiff material such as plastic. The door 515 may be made of clear plastic or other generally stiff material as desired. Additionally, while the walls of the paperboard boxes are referred to herein as top, bottom, and side walls, it should be understood that those terms are used merely for reference purposes to facilitate an understanding of the present invention, and do not require that the walls define the top, bottom or side of the dispensing container as such terms will change depending upon the orientation of the dispensing container. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A dispensing container for loading with a plurality of clean, reusable medical gowns and selectively dispensing same for use, the container being a flexible bag comprising:

a sidewall structure defining an interior of the container between first and second ends thereof, the interior being sized to hold a plurality of clean, reusable medical gowns, the sidewall structure being a liquid resistant, flexible web formed into a tube to define a tunnel shape to the container and render the container reusable through laundering;

an opening associated with the first end and communicating with the interior, the opening being sized to receive medical gowns therethrough;

a closure associated with the first end, the closure exposing the opening in an open state so that clean, reusable medical gowns are loadable into the interior through the opening, the closure closing the opening in a closed state so as to obstruct removal of reusable medical gowns from the interior through the opening, the closure being repeatedly manipulatable between the open and closed states;

at least a first controllable, elasticized access aperture communicating with the interior and associated with the second end so as to be spaced, at least in part, from the first end and the opening thereof, the elasticized aperture being selectively closed and opened and through which to selectively remove a clean, reusable medical gown from the interior when the aperture is opened, access to medical gowns in the interior through the aperture being obstructed when the aperture is closed; and a drawstring associated with the elasticized opening by which to selectively close the elasticized opening; and first and second pairs of spaced-apart hanging straps associated with the first end, each strap of each pair of straps being in the form of a loop, the first pair of hanging straps being located relative to the closure so as to be accessible in at least the open state of the closure whereby to suspend the dispensing container vertically for loading clean, reusable medical gowns into the interior through the opening, the second pair of hanging straps being located relative to the closure so as to be accessible in at least the closed state of the closure whereby to suspend the dispensing container vertically for selective removal of a clean, reusable medical gown from the interior through the elasticized opening.

2. The dispensing container of claim 1, the closure being a hood associated with the first end and manipulatable between the open and closed states.

3. A dispensing container for loading with a plurality of clean, reusable medical gowns and selectively dispensing same for use, the container being a flexible bag comprising:

a sidewall structure defining an interior of the container between first and second ends thereof, the sidewall structure being a liquid resistant, flexible web formed into a tube to define a tunnel shape to the container and render the container reusable through laundering;

an opening associated with the first end and communicating with the interior;

a closure associated with the first end, the closure exposing the opening in an open state so that clean, reusable medical gowns are loadable into the interior through the opening, the closure closing the opening in a closed state so as to obstruct removal of reusable medical gowns from the interior through the opening, the closure being repeatedly manipulatable between the open and closed states, the closure being a hood manipulatable between the open and closed states;

at least a first controllable elasticized access aperture communicating with the interior and associated with the second end so as to be spaced, at least in part, from the first end and the opening thereof through which to selectively remove a clean, reusable medical gown from the interior;

a drawstring associated with the elasticized opening by which to selectively close the elasticized opening; and first and second pairs of spaced-apart hanging straps associated with the first end, each strap of each pair of straps being in the form of a loop, the first pair of hanging straps being located relative to the hood so as to be accessible in at least the open state of the hood whereby to suspend the dispensing container vertically for loading clean, reusable medical gowns into the interior through the opening, the second pair of hanging straps being located relative to the hood so as to be accessible in at least the closed state of the hood whereby to suspend the dispensing container vertically for selective removal of a clean, reusable medical gown from the interior through the elasticized opening.

4. A dispensing container for loading with a plurality of clean, reusable medical gowns and selectively dispensing same for use, the container comprising:

a sidewall structure defining an interior of the container between first and second ends thereof, the interior being sized to hold a plurality of clean, reusable medical gowns;

an opening associated with the first end and communicating with the interior, the opening being sized to receive medical gowns therethrough;

a closure associated with the first end, the closure exposing the opening in an open state so that clean, reusable medical gowns are loadable into the interior through the opening, the closure closing the opening in a closed state so as to obstruct removal of reusable medical gowns from the interior through the opening, the closure being repeatedly manipulatable between the open and closed states;

at least a first controllable access aperture communicating with the interior, and spaced, at least in part, from the first end and the opening thereof, the aperture being selectively closed and opened and through which to selectively remove a clean, reusable medical gown from the interior when the aperture is opened, access to medical gowns in the interior through the aperture being obstructed when the aperture is closed; and first and second pairs of spaced-apart hanging straps associated with the first end, each strap of each pair of straps being in the form of a loop, the first pair of hanging straps being located relative to the closure so as to be accessible in at least the open state of the closure whereby to suspend the dispensing container vertically for loading clean, reusable medical gowns into the interior through the opening, the second pair of hanging straps being located relative to the closure so as to be accessible in at least the closed state of the closure whereby to suspend the dispensing container vertically for selective removal of a clean, reusable medical gown from the interior through the elasticized opening.

5. The dispensing container of claim 4, the closure being a hood associated with the first end and manipulatable between the open and closed states.

6. A dispensing container for loading with a plurality of clean, reusable medical gowns and selectively dispensing same for use, the container being a flexible bag comprising:

a sidewall structure defining an interior of the container between first and second ends thereof, the sidewall structure being a liquid resistant, flexible web formed into a tube to define a tunnel shape to the container and render the container reusable through laundering;

an opening associated with the first end and communicating with the interior;

a closure associated with the first end, the closure exposing the opening in an open state so that clean, reusable medical gowns are loadable into the interior through the opening, the closure closing the opening in a closed state so as to obstruct removal of reusable medical gowns from the interior through the opening, the closure being repeatedly manipulatable between the open and closed states, the closure being a hood manipulatable between the open and closed states;

at least a first controllable access aperture communicating with the interior, and spaced, at least in part, from the first end and the opening thereof through which to selectively remove a clean, reusable medical gown from the interior; and first and second pairs of spaced-apart hanging straps associated with the first end; each strap of each pair of straps being in the form of a loop, the first pair of hanging straps being located relative to the hood so as to be accessible in at least the open state of the hood whereby to suspend the dispensing container vertically for loading clean, reusable medical gowns into the interior through the opening, the second pair of hanging straps being located relative to the hood so as to be accessible in at least the closed state of the hood whereby to suspend the dispensing container vertically for selective removal of a clean, reusable medical gown from the interior through the elasticized opening.

\* \* \* \* \*